US008913060B2

(12) United States Patent
Kassab et al.

(10) Patent No.: US 8,913,060 B2
(45) Date of Patent: Dec. 16, 2014

(54) SYSTEMS AND METHODS FOR EXTRACTING A CURVE-SKELETON FROM A VOLUMETRIC IMAGE OF A VESSEL

(75) Inventors: Ghassan S. Kassab, Zionsville, IN (US); Thomas Wischgoll, Beavercreek, OH (US)

(73) Assignee: DTherapeutics, LLC, San Diego, CA (US)

( * ) Notice: Subject to any disclaimer, the term of this patent is extended or adjusted under 35 U.S.C. 154(b) by 65 days.

(21) Appl. No.: 12/505,685

(22) Filed: Jul. 20, 2009

(65) Prior Publication Data

US 2009/0322749 A1   Dec. 31, 2009

Related U.S. Application Data

(63) Continuation of application No. 12/522,664, filed as application No. PCT/US2008/000791 on Jan. 22, 2008.

(60) Provisional application No. 60/881,837, filed on Jan. 23, 2007.

(51) Int. Cl.
| | |
|---|---|
| *G06T 15/00* | (2011.01) |
| *G06T 7/60* | (2006.01) |
| *G06T 7/00* | (2006.01) |
| *G06T 17/20* | (2006.01) |

(52) U.S. Cl.
CPC ..... *G06T 7/0083* (2013.01); *G06T 2207/20044* (2013.01); *G06T 7/606* (2013.01); *G06T 2207/30172* (2013.01); *G06T 2207/10081* (2013.01); *G06T 7/0012* (2013.01); *G06T 2207/30101* (2013.01); *G06T 7/602* (2013.01); *G06T 17/20* (2013.01)
USPC ........... 345/424; 382/130; 382/131; 382/132; 382/154

(58) Field of Classification Search
None
See application file for complete search history.

(56) References Cited

U.S. PATENT DOCUMENTS

| | | | | |
|---|---|---|---|---|
| 5,937,083 | A * | 8/1999 | Ostuni .......................... | 382/131 |
| 6,680,735 | B1 * | 1/2004 | Seiler et al. ................... | 345/424 |
| 6,771,262 | B2 * | 8/2004 | Krishnan ....................... | 345/424 |

(Continued)

OTHER PUBLICATIONS

John et al., "Automatic Left Atrium Segmentation by Cutting the Blood Pool at Narrowings," Medical Image Computing and Computer-Assisted Intervention, Oct. 2005, vol. 3750, pp. 800-802.*

(Continued)

*Primary Examiner* — Daniel F Hajnik
*Assistant Examiner* — Andrew G Yang
(74) *Attorney, Agent, or Firm* — Reichel IP LLP; Mark C. Reichel; Natalie J. Dean

(57) ABSTRACT

An accurate analysis of the spatial distribution and intravascular pattern of blood flow in any organ must be based on detailed morphometry (diameters, lengths, vessel numbers, branching pattern, branching angles, etc.) of the organ vasculature. Despite the significance of detailed morphometric data, there is relative scarcity of database on vascular anatomy, mainly because the process is extremely labor intensive. Novel methods in the form of a segmentation algorithm for semi-automation of morphometric data extraction are provided. The extraction algorithm is based on a topological analysis of a vector field generated by the normal vectors of the extracted vessel wall. With this approach, special focus is made on achieving the highest accuracy of the measured values, with excellent results when compared to manual measurements of the main trunk of the coronary arteries with microscopy.

20 Claims, 17 Drawing Sheets

(56) References Cited

U.S. PATENT DOCUMENTS

| | | | |
|---|---|---|---|
| 7,310,435 B2* | 12/2007 | Mallya et al. | 382/128 |
| 7,327,362 B2* | 2/2008 | Grau | 345/423 |
| 7,576,741 B2* | 8/2009 | Matsumoto | 345/424 |
| 7,676,257 B2* | 3/2010 | Suryanarayanan et al. | 600/425 |
| 7,924,279 B2* | 4/2011 | Gerritsen et al. | 345/424 |
| 2003/0067461 A1 | 4/2003 | Fletcher et al. | |
| 2004/0109603 A1* | 6/2004 | Bitter et al. | 382/154 |
| 2004/0127797 A1* | 7/2004 | Barnard et al. | 600/449 |
| 2004/0223036 A1 | 11/2004 | Inoue et al. | |
| 2005/0152588 A1* | 7/2005 | Yoshida et al. | 382/128 |
| 2007/0002043 A1 | 1/2007 | Guenter et al. | |
| 2008/0273777 A1* | 11/2008 | Luboz et al. | 382/130 |
| 2009/0306504 A1* | 12/2009 | Arai et al. | 600/443 |

OTHER PUBLICATIONS

PCT/US08/00791, PCT Search Report and Written Opinion dated Aug. 18, 2008.

Ahuja N, Chuang J. Shape representation using a generalized potential field model. IEEE Trans. Pattern Analysis and Machine Intelligence, 1997, 19(2):169-176.

Amenta N, Choi S, Kolluri R. The power crust. Proc. of 6th ACM Symp. on Solid Modeling, 2001, pp. 249-260.

Aylward SR, Bullit E. Initialization, noise, singularities, and scale in height ridge traversal for tubular object centerline extraction. IEEE Trans Med Imaging, 2002, 21(2), pp. 61-75.

Bitter I, Kaufman AE, Sato M. Penalized-distance volumetric skeleton algorithm. IEEE Transactions on Visualization and Computer Graphics, 2001, 7(3), pp. 195-206.

Bouix S, Siddiqi K. Divergence-based medial surfaces. ECCV 1842:603-618, 2000.

Brunner D, Brunnett G. Mesh segmentation using the object skeleton graph. Proc. IASTED International Conf. on Computer Graphics and Imaging, 2004, pp. 48-55.

Den Buijs JO, Bajzer Z, Ritman EL. Branching morphology of the rat hepatic portal vein tree: A Micro-CT Study, Ann Biomed Eng, 13, 2006.

Bullitt E, Aylward S, Smith K, Mukherji S, Jiroutek M, Muller K. Symbolic description of intracerebral vessels segmented from magnetic resonance angiograms and evaluation by comparison with X-ray angiograms. Med Image Anal., 5(2)157-169, 2001.

Canny JF. A computational approach to edge detection, IEEE Trans, Pattern Analysis and Machine Intelligence, 1986, vol. PAMI-8, No. 6, pp. 679-698.

Cornea ND, Silver D, Min P. Curve-skeleton applications. Proc. IEEE Visualization, 2005, pp. 95-102.

Cornea ND, Silver D, Yuan X, Balasubramanian R. Computing hierarchical curve-skeletons of 3D objects. The Visual Computer, 21(11):945-955, 2005.

Dey TK, Goswami S. Tight Cocone: A water-tight surface reconstructor. Proc. 8th ACM Sympos. Solid Modeling Applications, 127-134. Journal version in J. of Computing and Infor. Sci, Engin., vol. 30, 2003, pp. 302-307.

Gao L, Heath DG, Fishman EK, Abdominal image segmentation using three-dimensional deformable models. Invest Radiol. 33(6):348-355, 1998.

Gill JD, Ladak HM, Steinman DA, Fenster A. Accuracy and variability assessment of a semiautomatic technique for segmentation of the carotid arteries from three-dimensional ultrasound images. Med Phys, 27(6):1333-1342, 2000.

Golland P, Eric W, Grimson WEL. Fixed topology skeletons. IEEE CVPR, 2000, pp. 10-17.

Gong W, Bertrand G, A simple parallel 3D thinning algorithm. Proc. IEEE Pattern Recognition, 1990, pp. 188-190.

He T, Hong L, Chen D, Liang Z. Reliable path for virtual endoscopy: ensuring complete examination of human organs. IEEE Trans. Visualization and Comp. Graphics, 7(4):333-342, 2001.

Hirsch MW, Smale S. Differential equations, dynamical systems and linear algebra, Academic Press, 1974.

Jain R, Kasturi R, Schunck BG. Machine Vision. McGraw-Hill,Inc., New York, 1995.

Kaimovitz B, Lanir Y, Kassab GS. Large-scale 3-D geometric reconstruction of the porcine coronary arterial vasculature based on detailed anatomical data. Ann. Biomed. Eng., 33 (11), 2005, pp. 1517-1535.

Kanitsar A, Fleischmann D, Wegenkittl R, Felkel P, Grölier E. CPR. Curved planar reformation. Proc. IEEE Visualization, 2002, pp. 37-44.

Lee T, Kashyap RL, Chu CN. Building skeleton models via 3-D medial surface/axis thinning algorithms. CVGIP: Graphical Models and Image Processing, 56(6):462-478, 1994.

Lobregt S, Verbeek PW, Groen FCA. Three-dimensional skeletonization: principle and algorithm. IEEE Transactions on Pattern Analysis and Machine Intelligence, 2(1): 75-77, 1980.

Lohou C, Bertrand G. A 3D 12-subiteration thinning algorithm based on P-simple points. Discrete Applied Mathematics 139:171-195, 2004.

Luboz V, Wu X, Krissian K, Westin CF, Kikinis R, Cotin S, Dawson S. A segmentation and reconstruction technique for 3D vascular structures. MICCAI 2005, Lecture Notes in Computer Science 3749:43-50, 2005.

Malandain G, Fernández-Vidal S. Euclidean skeletons, Image and Vision Computing. vol. 16:317-327, 1998.

Martinez-Perez ME, Hughes AD, Stanton AV, Thom SA, Chapman N, Bharath AA, Parker KH. Retinal vascular tree morphology; a semi-automatic quantification. IEEE Trans Biomed Eng., 49 (8):912-917, 2002.

Masutani Y, MacMahon H, Doi K. Automated segmentation and visualization of the pulmonary vascular tree in spiral CT angiography: an anatomy-oriented approach based on three-dimensional image analysis. J Comput Assist Tomogr., 25(4):587-597, 2001.

Nordsletten DA, Blackett S, Bentley MD, Ritman EL, Smith NP. Structural morphology of renal vasculature. Am J Physiol Heart Circ Physiol,, 291(1):H296-309, 2006.

Palágyi K, Kuba A. Directional 3D thinning using 8 subiterations. Proc. Discrete Geometry for Computer Imagery, Lecture Notes in Computer Science 1568:325-336., 1999.

Palágyi K, Kuba A. A parallel 3D 12-subiteration thinning algorithm. Graphical Models and Image Proc., 61(4):199-221, 1999.

Passat N, Ronse C, Baruthio J, Armspach JP, Maillot C. Magnetic resonance angiography: From anatomical knowledge modeling to vessel segmentation. Med Image Anal., 10(2):259-274, 2006.

Passat N, Ronse C, Baruthio J, Armspach JP, Maillot C, Jahn C. Region-growing segmentation of brain vessels: An atlas-based automatic approach. J Magn Reson Imaging., 21(6):715-725, 2005.

Perchet D, Fetita CI, Preteux F, Advanced navigation tools for virtual bronchoscopy. Proc. SPIE Conf. on Image Processing: Algorithms and Systems III, 2004, vol. 5298, pp. 147-158.

Saha PK, Chaudhuri BB, Dutta Majumder D. A new shape preserving parallel thinning algorithm for 3d digital images. Pattern Recognition, 30(12):1939-1955, 1997.

Sauret V, Goatman KA, Fleming JS, Bailey AG. Semi-automated tabulation of the 3D topology and morphology of branching networks using CT: application to the airway tree. Phys Med Biol., 44(7): 1625-1638, 1999.

Schirmacher H, Zöckler M, Stalling D, Hege H. Boundary surface shrinking—a continuous approach to 3D center line extraction. Proc. of IMDSP, 25-28, 1998.

Schmitt S, Evers JF, Duch C, Scholz M, Obermayer K, New methods for the computer-assisted 3-D reconstruction of neurons from confocal image stacks, NeuroImage 23 (2004), 1283-1298, 2004.

Sethian JA. Fast marching methods. SIAM Review, 41(2):199-235, 1999.

Si H, TetGen. A quality tetrahedral mesh generator and three-dimensional delaunay triangulator. WIAS Technical Report No. 9, 2004.

Spaan JA, ter Wee R, van Teeffelen JW, Streekstra G, Siebes M, Kolyva C, Vink H, Fokkema DS, VanBavel E. Visualization of intramural coronary vasculature by an imaging cryomicrotome suggests compartmentalization of myocardial perfusion areas. Med Biol Eng Comput., 43(4), pp. 431-435, 2005.

(56) References Cited

OTHER PUBLICATIONS

Stefancik RM, Sonka M. Highly automated segmentation of arterial and venous trees from three-dimensional magnetic resonance angiography (MRA). Int J Cardiovasc Imaging, 17(1):37-47, 2001.

Sundar H, Silver D, Gagvani N, Dickinson S, Skeleton based shape matching and retrieval. Proc. Shape Modeling Int'l, 2003, p. 130.

Telea A, Vilanova A. A robust level-set algorithm for centerline extraction. Eurographics/IEEE Symp. On Data Visualization, 2003, pp. 185-194.

Tsao YF, Fu KS. A parallel thinning algorithm for 3D pictures. Computer Vision, Graphics and Image Proc., 1981, 17:315-331.

Ukil S, Reinhardt JM, Smoothing lung segmentation surfaces in three-dimensional X-ray CT images using anatomic guidance. Acad Radiol., 12(12):1502-1511, 2005.

Wade L, Parent RE. Automated generation of control skeletons for use in animation. The Visual Computer 18(2):97-110, 2002.

Wan M, Dachille F, Kaufman A. Distance-field based skeletons for virtual navigation. Proc. IEEE Visualization, 2001, pp. 239-245.

Wan SY, Kiraly AP, Ritman EL, Higgins WE. Extraction of the hepatic vasculature in rats using 3-D micro-CT images. IEEE Trans Med Imaging., 19(9):964-971, 2000.

Wan SY, Ritman EL, Higgins WE. Multi-generational analysis and visualization of the vascular tree in 3D micro-CT images. Comput Biol Med., 32(2):55-71, 2002.

Wischgoll T. Closed streamlines in flow visualization. Ph.D. Thesis, Universitat Kaiserslautern, Germany, 2002.

Zhang L, Chapman BE, Parker DL, Roberts JA, Guo J, Vemurl P, Moon SM, Noo F. Automatic detection of three-dimensional vascular tree centerlines and bifurcations in high-resolution magnetic resonance angiography. Invest Radiol., 2005, 40(10):661-671.

Zhou Y, Kaufman A, Toga AW, Three-dimensional skeleton and centerline generation Based on an Approximate Minimum Distance Field. The Visual Computer, 1998, 14, pp. 303-314.

Zhou Y, Toga AW. Efficient skeletonization of volumetric objects. IEEE Trans, Visualization and Comp. Graphics, 1999, 5(3);196-209.

Chaturvedi A, Lee Z. Three-dimensional segmentation and skeletonization to build an airway tree data structure for small animals. Phys Med Biol., 50(7):1405-1419, 2005.

\* cited by examiner

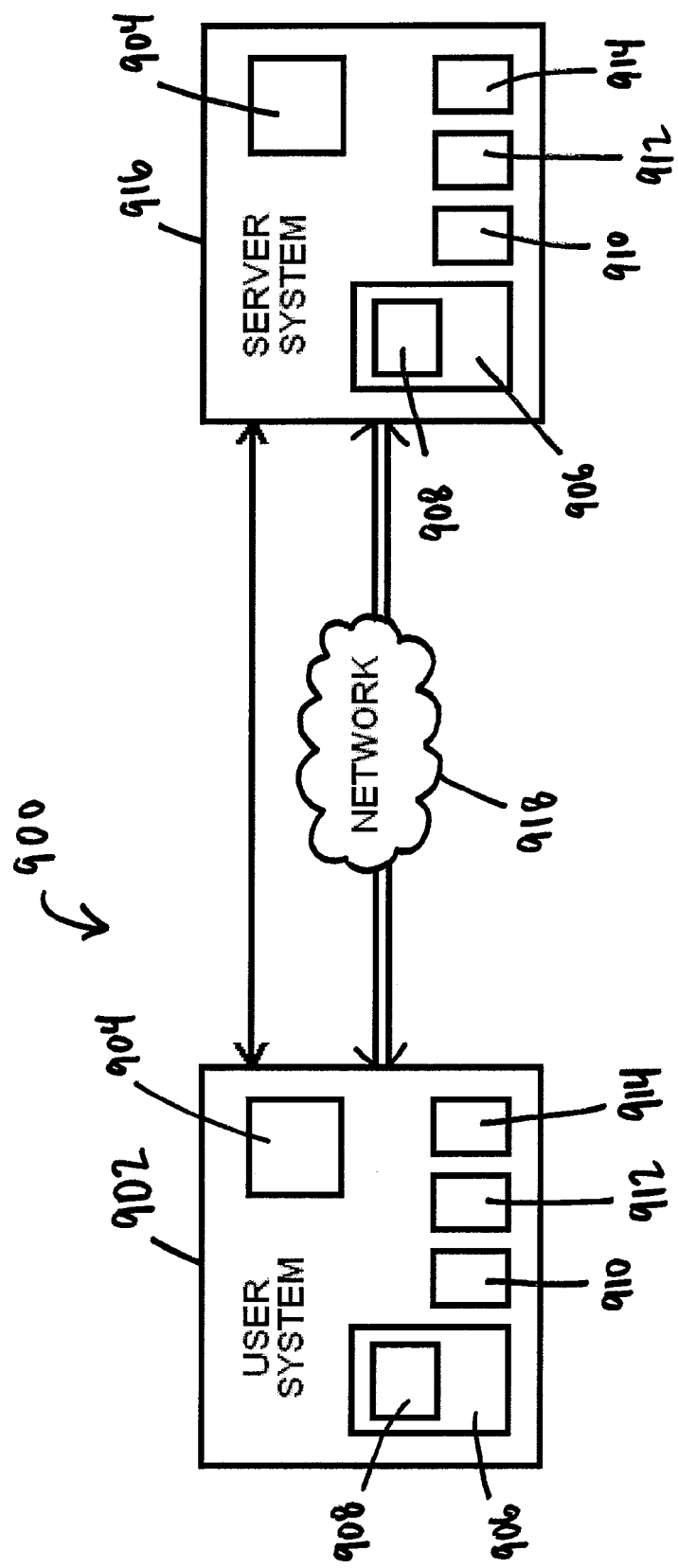

SYSTEMS AND METHODS FOR EXTRACTING A CURVE-SKELETON FROM A VOLUMETRIC IMAGE OF A VESSEL

PRIORITY

The present application is a continuation patent application that is related to, and claims the priority benefit of, U.S. patent application Ser. No. 12/522,664, filed Jul. 9, 2009, which is related to, claims the priority benefit of, and is a U.S. national stage patent application of, International Patent Application Serial No. PCT/US2008/000791, filed Jan. 23, 2008, which is related to, and claims the priority benefit of, U.S. Provisional Patent Application Ser. No. 60/881,837, filed Jan. 23, 2007. The contents of each of these applications are hereby incorporated by reference in their entirety into this disclosure.

BACKGROUND

The disclosure of the present application relates generally to medical imaging, and more particularly, to mapping of the vascular system.

Analysis of spatial perfusion of blood flow of any organ requires detailed morphometry on the geometry (including, but not limited to, diameters, lengths, number of vessels, etc.) and the corresponding branching patterns (including, but not limited to, three-dimensional (3D) angles, connectivity of vessels, etc.). Despite the significance of morphometric data for understanding spatial distribution of blood flow and hemodynamics, the data are relatively sparse. One of the major reasons for the scarcity of morphometric data is the tremendous labor required to obtain such data. Reconstructing and counting a significant number of vessels in most organs is an extremely labor-intensive endeavor. As such, what is needed to accomplish the same result is the development of a labor-saving methodology.

Several approaches for extracting curve-skeletons or medial axes can be found in the literature. Different studies can be found on segmentation of volumetric data sets. Representative approaches include surface extraction based on an energy function using the image gradient, deformable meshes, hysteresis thresholding and region growing, m-reps, skeletons composed of atoms (hubs) connected to the surface, and distance to the vessel wall combined with a penalty function. For example, and to improve the segmentation, Lei et al. (*Artery-vein separation via MRA—An image processing approach. IEEE Trans Med Imaging,* 20(8):689-703, 2001) deployed fuzzy connectedness to segment vessels and distinguish between arteries and veins, while Chung et al. (*Vascular segmentation of phase contrast magnetic resonance angiograms based on statistical mixture modeling and local phase coherence. IEEE Trans Med Imaging,* 23(12):1490-1507, 2004) used different mixture models. Gan et al. (*Statistical cerebrovascular segmentation in three-dimensional rotational angiography based on maximum intensity projections. Med Phys.,* 32(9):3017-3028, 2005) analyzed the maximum intensity distribution to identify optimal thresholds to extract vessels from a series of maximum intensity projections. By using an atlas, Passat et al. (*Region-growing segmentation of brain vessels: An atlas-based automatic approach. J Magn Reson Imaging.,* 21(6):715-725, 2005) divided the human brain into different areas to optimize a region growing segmentation of brain vessels. Subsequently, the atlas was refined by adding morphological data, such as vessel diameter and orientation, to extract a vascular tree from phase contrast MRA data. Centerlines extracted using the algorithm by Aylward et al. (*Initialization, noise, singularities, and scale in height ridge traversal for tubular object centerline extraction. IEEE Trans Med Imaging,* 21(2):61-75, 2002) based on intensity ridge traversal were smoothed using a B-spline-based approach to get smoother results. Zhang et al. (*Automatic detection of three-dimensional vascular tree centerlines and bifircations in high-resolution magnetic resonance angiography. Invesi Radiol.,* 40(10):661-671, 2005) described a centerline extraction algorithm based on Dijkstra's algorithm using a distance-field cost function. The jagged lines that typically result from voxel-based centerline extraction algorithms were smoothed using either cubic splines or Chebyshev polynomials. Other artifacts from the results of a 3D thinning algorithm, such as cycles, spurs, and non-unit-width parts, can be removed by using an approach by Chen et al. (*Automatic 3D vascular tree construction in CT angiography. Comput Med Imaging Graph.,* 27(6):469-479, 2003). Ukil et al. (*Smoothing lung segmentation surfaces in three-dimensional X-ray CT images using anatomic guidance. Acad Radiol.,* 12(12):1502-1511, 2005) introduced a smoothing approach for airways of a lung based on an ellipsoidal kernel before segmenting and thinning the 3D volumetric image.

To describe a geometric model of the vessels of brain data sets, Volkau et al. (*Geometric Modeling of the Human Normal Cerebral Arterial System. IEEE Transactions on Medical Imaging,* 24(4):529-539, 2005) used the centerline and radii to describe cylinders. The centerlines were smoothed using average filtering to avoid self-intersections of the cylinders. The surfaces of the cylinders were modeled following a Catmull-Clark sub-division surface approach. For extracting centerlines from volumetric images, topology- or connectivity-preserving thinning is a common approach. By using the Hessian of the image intensity, Bullet et al. (*Symbolic description of intracerebral vessels segmented from magnetic resonance angiograms and evaluation by comparison with X-ray angiograms. Med Image Anal.,* 5(2):157-169, 2001) developed a ridge line detection method to identify centerlines. Once the centerline is determined, quantitative data, such as lengths, areas, and angles, can be extracted as shown by Martinez-Perez et al. (*Retinal vascular tree morphology: a semi-automatic quantification. IEEE Trans Biomed Eng.,* 49(8):912-917, 2002) and Wan et al. (*Multi-generational analysis and visualization of the vascular tree in 3D micro-CT images. Comput Biol Med.,* 32(2):55-71, 2002). A detailed data structure for building an airway tree was described by Chaturvedi et al. (*Three-dimensional segmentation and skeletonization to build an airway tree data structure for small animals. Phys Med Biol.,* 50(7):1405-1419, 2005). Recently, Nordsletten et al. (*Structural morphology of renal vasculature. Am J Physiol Heart Circ Physiol.,* 291(1):H296-309, 2006) proposed an approach that segments vessels of rat kidney based on iso-surface computation. Using the surface normals, the surface projects to the center of the vessels, while a snake algorithm collects and connects the resulting point cloud. To analyze the branching morphology of the rat hepatic portal vein tree, Den Buijs et al. (*Branching morphology of the rat hepatic portal vein tree: A Micro-CT Study. Ann Biomed Eng,* 13, 2006) compared the radii and branching angles of the vessels to a theoretical model of dichotomous branching.

Software-based analysis and computation of the vector field of a vascular tree has traditionally been slow and cumbersome. Some methods begin with all voxels of a volumetric image and use a thinning technique to shrink down the object to a single line. Ideally, the topology of the object should be preserved as proposed by Lobregt et al. (*Three-dimensional skeletonization: principle and algorithm. IEEE Transactions* on *Pattern Analysis and Machine Intelligence*, 2(1): 75-77, 1980), which is the basic technique used in commercial software systems, such as Analyze™ (AnalyzeDirect, Inc., Overland Park, Kans.). The disadvantage of this approach is that it tends to produce jagged lines which do not allow accurate measurements of branch angles. Luboz et al. (*A segmentation and reconstruction technique for 3D vascular structures. MICCAI 2005, Lecture Notes in Computer Science* 3749:43-50, 2005) used a thinning-based technique to determine vessel radii and lengths from a CTA scan. A smoothing filter was employed to eliminate the jaggedness of the thinning process and the results were validated using a silicon phantom. A standard deviation of 0.4 mm between the computed and the actual measurements was reported for a scan with similar resolution as that used in the embodiments of the disclosure of the present application.

The disadvantage of thinning algorithms is that they can only be applied to volumetric data sets. Since the approach presented herein is not based on voxels it can be applied to non-volumetric data; i.e., it is also applicable to geometric data sets, such as those obtained from laser scans. Furthermore, the location of the centerline is determined at a higher numerical precision since its defining points are not bound to a single voxel. This also helps avoid the jagged representation of the centerlines.

Other approaches use the distance transform or distance field in order to obtain a curve-skeleton. For each point inside the object, the smallest distance to the boundary surface is determined. For example, fast marching methods can be employed to compute the distance field. Voxels representing the centerlines of the object are identified by finding ridges in the distance field. The resulting candidates must then be pruned first. The resulting values are connected using a path connection or minimum span tree algorithm. The distance field can also be combined with a distance-from-source field to compute a skeleton. Similar to thinning approaches, these methods are voxel-based and tend to generate the same jagged centerlines. This implies that a centerline can deviate from its original location by up to half a voxel due to the numerical representation. The approach of the disclosure of the present application does not suffer from this problem as it uses a higher numerical precision for the determination of centerlines.

A more recent method by Cornea et al. (*Computing hierarchical curve-skeletons of 3D objects. The Visual Computer,* 21(11):945-955, 2005) computes the distance field based on a potential similar to an electrical charge and then uses a 3D topological analysis to determine the centerlines. This approach, however, suffers from a few disadvantages when applied to CT scanned volumetric images. For example, it is computationally intensive such that computing the distance field alone would take several months. Furthermore, due to the rare occurrence of 3D singularities used as starting point for topological analysis, additional criteria have to be imposed. The method of the disclosure of the present application avoids this by linearly interpolating the vector field within the vessels and by performing a two-dimensional (2D) topological analysis in cross sections of the vessels only. This results in a significantly shorter computational time for generation of data which is very important for large data sets.

In addition to the foregoing, techniques based on Voronoi diagrams define a medial axis using the Voronoi points. Since this approach usually does not result in a single line but rather a surface shaped object, the points need to be clustered and connected in order to obtain a curve-skeleton. Voronoi-based methods can be applied to volumetric images as well as point sets. Due to the fact that clustering of the resulting points is required, these approaches lack accuracy. In addition, they tend to create points outside the object itself if there is an open or missing area within the object's boundary. These methods usually tend to extract medial surfaces rather than single centerlines. Hence, clustering of the resulting points is required which in turn may introduce numerical errors.

For extracting centerlines from volumetric images, geometry-based approaches are preferable over voxel-based approaches. Due to the discrete nature of a voxel of the volumetric image, the location of the centerline can have an error of half a voxel. Geometry-based methods do not have this problem. Nordsletten et al. determined normal vectors based on an iso-surface computed using the volumetric image. These normal vectors are projected inward. The resulting point cloud is then collected and connected by a snake algorithm. Since this method estimates the normal vectors, the center of the vessel is not necessarily in the direction of the normal vector. Hence, the computed centerline may not be absolutely accurate. The disclosure of the present application utilizes a technique based upon a vector field analysis with vectors pointing toward the vessel center. This method disclosed herein is more lenient with regard to vector direction while still finding accurate center points. The technique of the disclosure of the present application compensates for this type of error automatically. It is therefore expected that a more precise computation of center points is possible. The approach based on a 3D vector field analysis proposed by Cornea et al. results in a very accurate computation of the centerlines. The only difficulty with this approach is that computing the centerlines for a CT scanned volumetric image of the size 512 by 512 by 200 would take several months, which renders it inapplicable.

What is needed is a technique for extracting vascular structures from volumetric images that does not suffer from some of the drawbacks of conventional methods, is efficient, easy to use, intuitive, and based on more physiological conditions than prior techniques.

SUMMARY

The disclosure of the present application is capable of extracting vascular structures from volumetric images and computing diameters of the vessels in a more efficient manner. The validation of the computed diameters by comparing the computed values with manually measured diameters demonstrates the accuracy of the method. The method itself is not only capable of extracting the main trunk, but also the entire vascular tree. Hence, the approach allows the extraction of accurate quantitative data for the entire vasculature.

The disclosure of the present application introduces a system for extracting and measuring tubular objects from volumetric imagery of CT images of porcine coronary arteries. The present disclosure identifies the vessels and determines the centerlines of those vessels; i.e., it reduces the entire vasculature to a curve-skeleton. This in turn allows the system to compute the vessel radius at any given point as the distance between the centerline and the vessel wall. Furthermore, the present disclosure is validated against manually determined optical measurements of vessel diameters to assess its accuracy. Hence, the disclosure of the present application represents the first validation of a segmentation algorithm with actual vessel casts measured optically.

The disclosure of the present application provides a computer program product that utilizes a less computationally intensive way of computing the vector field. In addition, the topological analysis of the 2D vector fields within cross-sectional areas of the vessels can be computed more efficiently. This allows the processing of a CT scanned data set within a few hours which potentially can be reduced by optimization of the code making it more efficient. In addition to requiring less computational time, the proposed algorithm does not require the introduction of artificial starting points for the topological analysis, as the singularities defining the centerlines are generated by projecting the vector field onto the cross-sectional areas of the vessels.

In at least one embodiment of the present disclosure, a method for extracting a curve-skeleton from a volumetric image of a vessel having a local center and a boundary is provided, the method comprising the steps of segmenting vessels within the volumetric image to identify a plurality of points, determining a boundary of the plurality of points by moving the points along a gradient direction so that the points are located at a maximal gradient, computing a tetrahedrization of the plurality of points located at the maximal gradient along the boundary, computing a vector field of the plurality of points so that the vectors within the vector field point inwards toward the local center of the vessel, computing points using topological analysis of the vector field to identify center points within the vessel, and connecting the center points based upon topology of the tetrahedrization to create a centerline of the vessel within the volumetric image.

In another embodiment, the segmentation step is performed based on volumetric image gradients. In yet another embodiment, the step of computing a tetrahedrization of a plurality of points utilizes the implementation of a Delaunay tetrahedrization algorithm. In an additional embodiment, the step of computing a tetrahedrization of a plurality of points further utilizes tri-linear interpolation within one or more tetrahedra generated by the tetrahedrization of a plurality of points.

In at least one embodiment of a method of the present disclosure, the step of computing a vector field of the plurality of points determines a repulsive force field utilizing points on the boundary of the vessel, the repulsive force field generated by a force field within the vessel by electrically charging the boundary of the vessel. In yet another embodiment, the step of computing a vector field of the plurality of points defines a vector by using an identified point and points neighboring the identified point to define a plane approximated by the identified point and points neighboring the point. In a further embodiment, the plane comprises a normal, the normal defining an orthogonal vector corresponding to the identified point. In another embodiment, the step of computing a vector field of the plurality of points utilizes a vector field defined by three vectors located at the vertices of a triangle. In yet another embodiment, the step of computing a vector field of the plurality of points computes barycentric coordinates of a point within a triangle. In yet another embodiment, the barycentric coordinates are used as weights for linearly combining the three vectors to compute an interpolated vector.

In at least one embodiment of a method of the present disclosure, the step of computing a vector field of the plurality of points utilizes a computation so that the vectors within the vector field are orthogonal to the boundary of the vessel. In an additional embodiment, the step of computing a vector field of the plurality of points further utilizes a computation to linearly interpolate the vectors within the vector field. In yet another embodiment, the step of computing a vector field of the plurality of points utilizes an analysis of a matrix, whereby the matrix and a vector from the vector field describe a linear map. In an additional embodiment, the vector field is a linear vector field of type 1 and the matrix is diagonalizable. In yet another embodiment, the vector field is selected from the group consisting of saddle singularity, node singularity, and focus singularity. In a further embodiment, the vector field is a linear vector field of type 2. In yet another embodiment, the vector field is selected from the group consisting of center singularity and spiral singularity.

In at least one embodiment of a method of the present disclosure, the vector field is a linear vector field of type 3. In another embodiment, the vector field is an improper node singularity. In yet another embodiment, the step of computing points using topological analysis of the vector field to identify center points within the vessel comprises the computation of a topology of a vector field defined on the faces of a tetrahedralized set of points. In an additional embodiment, the step of computing points using topological analysis of the vector field is performed by computing singularities within the vector field interpolated within each faces of one or more tetrahedra generated by the tetrahedrization of a plurality of points.

In at least one embodiment of a method of the present disclosure, the step of computing points using topological analysis of the vector field is performed by identifying focus singularities and/or spiral singularities within one or more faces of one or more tetrahedral generated by the tetrahedrization of a plurality of points. In an additional embodiment, the step of computing points using topological analysis of the vector field is performed after the vectors within the vector field are projected onto one or more faces of one or more tetrahedra generated by the tetrahedrization of a plurality of points. In another embodiment, the vectors within the vector field are projected onto one or more faces of one or more tetrahedra at the vertices of the triangles comprising one or more tetrahedral, and whereby the step of computing points using topological analysis of the vector field comprises linear interpolation. In yet another embodiment, the diameter of the vessel at a particular location is computed as the distance between a center point and a first vessel boundary multiplied by two. In an additional embodiment, the step of comparing the diameter of the vessel at a particular location is computed by the method to a diameter of the vessel identified by optical measurements to determine any potential statistical variations between the two diameters.

In at least one embodiment of a method of the present disclosure, the method further comprises the step of filling gaps occurring between center points within the vessel. In another embodiment, the filling step is performed by identifying tetrahedral close to a gap having a center point at each end, and by determining individual fractions of a line contained within one or more tetrahedra. In yet another embodiment, the gap is filled if the sum of the individual fractions equals one. In an additional embodiment, the diameter of the vessel at a particular location is computed as the distance between a center point and a first vessel boundary plus the distance between the same center point and a second vessel boundary opposite the first vessel boundary.

In at least one embodiment of a method extracting a curve-skeleton of the present disclosure, the method comprises the steps of obtaining a volumetric image of a vasculature, and extracting a boundary of the volumetric image using a gradient threshold, the boundary comprising a plurality of points. In another embodiment, the method further comprises the step of moving the plurality of points along a gradient direction. In yet another embodiment, the method further comprises the step of determining a plurality of vectors orthogonal to a surface of the boundary from the plurality of points. In an additional embodiment, the step of determining a plurality of vectors is determined by deriving a least-square fit of a plurality of neighboring points to the plurality of points and utilizing a plurality of vectors.

In at least one embodiment of a method extracting a curve-skeleton of an object of the present disclosure, the method comprises the steps of extracting a boundary of the object, the boundary having a surface, computing a vector field, the vector field being orthogonal to the object's boundary surface, and determining the curve-skeleton by applying topological analysis to the vector field. In another embodiment, the method further comprises the step of automatically closing gaps between segments of the curve-skeleton. In yet another embodiment, the extracting step involves the extraction of a vasculature of a specimen. In an additional embodiment, the extracting step occurs only after the specimen has been perfused and CT-scanned. In a further embodiment, the vasculature is defined by a volumetric image, the volumetric image consisting of voxels aligned along a three-dimensional grid.

In at least one embodiment of a method of computing image gradients of the present disclosure, the method comprises the steps of identifying a set of voxels, neglecting all voxels within the set of voxels having a gradient length below a predetermined threshold length, and comparing remaining voxels to neighboring voxels to identify local maxima along the gradient. In another embodiment, the local maxima are identified by determining the gradients of neighboring voxels in positive and negative directions. In yet another embodiment, the local maxima are identified by comparing the gradients of neighboring voxels in positive and negative directions to one another. In even another embodiment, the local maxima are identified by determining a zero of a first derivative of a parabolic curve.

In at least one embodiment of a method of computing image gradients of the present disclosure, the neighboring voxels define a cube having a boundary, wherein the boundary comprises gradients, and wherein the gradients on the boundary of the cube are interpolated linearly to determine an approximation of the desired gradients. In another embodiment, a voxel within the set of voxels defines a neighborhood comprising twenty-six voxels forming the shape of a cube surrounding the original voxel. In yet another embodiment, the method further comprises the step of processing the local maxima along the gradient to identify a curve skeleton.

In at least one embodiment of a system for extracting a curve-skeleton from a volumetric image of a vessel having a local center and a boundary of the present disclosure, the system comprises a processor, a storage medium operably connected to the processor, the storage medium capable of receiving and storing morphometric data, wherein the processor is operable to segment vessels within the volumetric image to identify a plurality of points, determine a boundary of the plurality of points by moving the points along a gradient direction so that the points are located at a maximal gradient, compute a tetrahedrization of the plurality of points located at the maximal gradient along the boundary, compute a vector field of the plurality of points so that the vectors within the vector field point inwards toward the local center of the vessel, compute points using topological analysis of the vector field to identify center points within the vessel, and connect the center points based upon topology of the tetrahedrization to create a centerline of the vessel within the volumetric image. In another embodiment, the segmentation is performed based on volumetric image gradients. In yet another embodiment, the computation of a tetrahedrization of a plurality of points utilizes the implementation of a Delaunay tetrahedrization algorithm. In an additional embodiment, the computation of a tetrahedrization of a plurality of points further utilizes tri-linear interpolation within one or more tetrahedra generated by the tetrahedrization of a plurality of points. In yet an additional embodiment, the computation of a vector field of the plurality of points determines a repulsive force field utilizing points on the boundary of the vessel, the repulsive force field generated by a force field within the vessel by electrically charging the boundary of the vessel.

In at least one embodiment of a system of the present disclosure, the computation of a vector field of the plurality of points defines a vector by using an identified point and points neighboring the identified point to define a plane approximated by the identified point and points neighboring the point. In an additional embodiment, the plane comprises a normal, the normal defining an orthogonal vector corresponding to the identified point. In another embodiment, the computation of a vector field of the plurality of points utilizes a vector field defined by three vectors located at the vertices of a triangle. In yet another embodiment, the computation of a vector field of the plurality of points computes barycentric coordinates of a point within a triangle.

In at least one embodiment of a system of the present disclosure, the barycentric coordinates are used as weights for linearly combining the three vectors to compute an interpolated vector. In another embodiment, the computation of a vector field of the plurality of points utilizes a computation so that the vectors within the vector field are orthogonal to the boundary of the vessel. In yet another embodiment, the computation of a vector field of the plurality of points further utilizes a computation to linearly interpolate the vectors within the vector field. In an additional embodiment, the computation of a vector field of the plurality of points utilizes an analysis of a matrix, whereby the matrix and a vector from the vector field describe a linear map. In even an additional embodiment, the vector field is a linear vector field of type 1 and the matrix is diagonalizable. In an additional embodiment, the vector field is selected from the group consisting of saddle singularity, node singularity, and focus singularity.

In at least one embodiment of a system of the present disclosure, the vector field is a linear vector field of type 2. In another embodiment, the vector field is selected from the group consisting of center singularity and spiral singularity. In yet another embodiment, the vector field is a linear vector field of type 3. In an additional embodiment, the vector field is an improper node singularity.

In at least one embodiment of a system of the present disclosure, the computation of points using topological analysis of the vector field to identify center points within the vessel comprises the computation of a topology of a vector field defined on the faces of a tetrahedralized set of points. In another embodiment, the computation of points using topological analysis of the vector field is performed by computing singularities within the vector field interpolated within each faces of one or more tetrahedra generated by the tetrahedrization of a plurality of points. In yet another embodiment, the computation of points using topological analysis of the vector field is performed by identifying focus singularities and/or spiral singularities within one or more faces of one or more tetrahedral generated by the tetrahedrization of a plurality of points. In an additional embodiment, the computation of points using topological analysis of the vector field is performed after the vectors within the vector field are projected onto one or more faces of one or more tetrahedra generated by the tetrahedrization of a plurality of points.

In at least one embodiment of a system of the present disclosure, the vectors within the vector field are projected onto one or more faces of one or more tetrahedra at the vertices of the triangles comprising one or more tetrahedral, and whereby the step of computing points using topological analysis of the vector field comprises linear interpolation. In another embodiment, the diameter of the vessel at a particular location is computed as the distance between a center point and a first vessel boundary multiplied by two. In yet another embodiment, the processor is further operable to compare the computed diameter of the vessel at a particular location to a diameter of the vessel identified by optical measurements to determine any potential statistical variations between the two diameters. In an additional embodiment, the processor is further operable to fill gaps occurring between center points within the vessel. In another embodiment, the filling step is performed by identifying tetrahedral close to a gap having a center point at each end, and by determining individual fractions of a line contained within one or more tetrahedra. In an additional embodiment, the gap is filled if the sum of the individual fractions equals one.

In at least one embodiment of a system of the present disclosure, the diameter of the vessel at a particular location is computed as the distance between a center point and a first vessel boundary plus the distance between the same center point and a second vessel boundary opposite the first vessel boundary. In another embodiment, the system further comprises a program stored upon the storage medium, said program operable by the processor upon the morphometric data. In yet another embodiment, the system comprises a user system and a server system, and wherein the user system and the server system are operably connected to one another.

In at least one embodiment of a system for extracting a curve-skeleton of the present disclosure, the system comprises a processor, a storage medium operably connected to the processor, the storage medium capable of receiving and storing morphometric data, wherein the processor is operable to obtain a volumetric image of a vasculature, and extract a boundary of the volumetric image using a gradient threshold, the boundary comprising a plurality of points. In another embodiment, the processor is further operable to move the plurality of points along a gradient direction. In yet another embodiment, the processor is further operable to determine a plurality of vectors orthogonal to a surface of the boundary from the plurality of points. In a further embodiment, the determination of a plurality of vectors is determined by deriving a least-square fit of a plurality of neighboring points to the plurality of points and utilizing a plurality of vectors. In an additional embodiment, the system further comprises a program stored upon the storage medium, said program operable by the processor upon the morphometric data. In even another embodiment, the system comprises a user system and a server system, and wherein the user system and the server system are operably connected to one another.

In at least one embodiment of a system for extracting a curve-skeleton from a volumetric image of a vessel of the present disclosure, the system comprises a processor, a storage medium operably connected to the processor, the storage medium capable of receiving and storing morphometric data, wherein the processor is operable to extract a boundary of the object, the boundary having a surface, compute a vector field, the vector field being orthogonal to the object's boundary surface, and determine the curve-skeleton by applying topological analysis to the vector field. In another embodiment, the processor is further operable to automatically closing gaps between segments of the curve-skeleton. In an additional embodiment, the extraction of a boundary of the object involves the extraction of a vasculature of a specimen. In another embodiment, the extraction of a boundary of the object occurs only after the specimen has been perfused and CT-scanned. In yet another embodiment, the vasculature is defined by a volumetric image, the volumetric image consisting of voxels aligned along a three-dimensional grid. In a further embodiment, the system further comprises a program stored upon the storage medium, said program operable by the processor upon the morphometric data. In even another embodiment, the system comprises a user system and a server system, and wherein the user system and the server system are operably connected to one another.

In at least one embodiment of a system for extracting a curve-skeleton from a volumetric image of a vessel of the present disclosure, the system comprises a processor, a storage medium operably connected to the processor, the storage medium capable of receiving and storing morphometric data, wherein the processor is operable to identify a set of voxels, neglect all voxels within the set of voxels having a gradient length below a predetermined threshold length, and compare remaining voxels to neighboring voxels to identify local maxima along the gradient. In another embodiment, the local maxima are identified by determining the gradients of neighboring voxels in positive and negative directions. In yet another embodiment, the local maxima are identified by comparing the gradients of neighboring voxels in positive and negative directions to one another.

In at least one embodiment of a system for extracting a curve-skeleton from a volumetric image of a vessel of the present disclosure, the local maxima are identified by determining a zero of a first derivative of a parabolic curve. In another embodiment, the neighboring voxels define a cube having a boundary, wherein the boundary comprises gradients, and wherein the gradients on the boundary of the cube are interpolated linearly to determine an approximation of the desired gradients. In yet another embodiment, a voxel within the set of voxels defines a neighborhood comprising twenty-six voxels forming the shape of a cube surrounding the original voxel. In an additional embodiment, the system further comprises the step of processing the local maxima along the gradient to identify a curve skeleton. In another embodiment, the system further comprises a program stored upon the storage medium, said program operable by the processor upon the morphometric data. In yet another embodiment, the system comprises a user system and a server system, and wherein the user system and the server system are operably connected to one another.

In at least one embodiment of a program having a plurality of program steps to be executed on a computer having a processor and a storage medium to extract a curve-skeleton from a volumetric image of a vessel having a local center and a boundary of the present disclosure, the program is operable to segment vessels within the volumetric image to identify a plurality of points, determine a boundary of the plurality of points by moving the points along a gradient direction so that the points are located at a maximal gradient, compute a tetrahedrization of the plurality of points located at the maximal gradient along the boundary, compute a vector field of the plurality of points so that the vectors within the vector field point inwards toward the local center of the vessel, compute points using topological analysis of the vector field to identify center points within the vessel, and connect the center points based upon topology of the tetrahedrization to create a centerline of the vessel within the volumetric image. In another embodiment, the processor is further capable of calculating the vessel radius at any given point as the distance between the centerline of the vessel and the boundary.

In at least one embodiment of a program having a plurality of program steps to be executed on a computer having a processor and a storage medium to extract a curve-skeleton from a volumetric image of a vessel having a local center and a boundary of the present disclosure, the program is operable to obtain a volumetric image of a vasculature, and extract a boundary of the volumetric image using a gradient threshold, the boundary comprising a plurality of points.

In at least one embodiment of a program having a plurality of program steps to be executed on a computer having a processor and a storage medium to extract a curve-skeleton from a volumetric image of a vessel having a local center and a boundary of the present disclosure, the program is operable to extract a boundary of the object, the boundary having a surface, compute a vector field, the vector field being orthogonal to the object's boundary surface, and determine the curve-skeleton by applying topological analysis to the vector field.

In at least one embodiment of a program having a plurality of program steps to be executed on a computer having a processor and a storage medium to extract a curve-skeleton from a volumetric image of a vessel having a local center and a boundary of the present disclosure, the program is operable to identify a set of voxels, neglect all voxels within the set of voxels having a gradient length below a predetermined threshold length, and compare remaining voxels to neighboring voxels to identify local maxima along the gradient.

BRIEF DESCRIPTION OF THE DRAWINGS

FIG. 9 shows a morphometric data extraction system according to at least one embodiment of the present disclosure.

DETAILED DESCRIPTION

Figure 1:
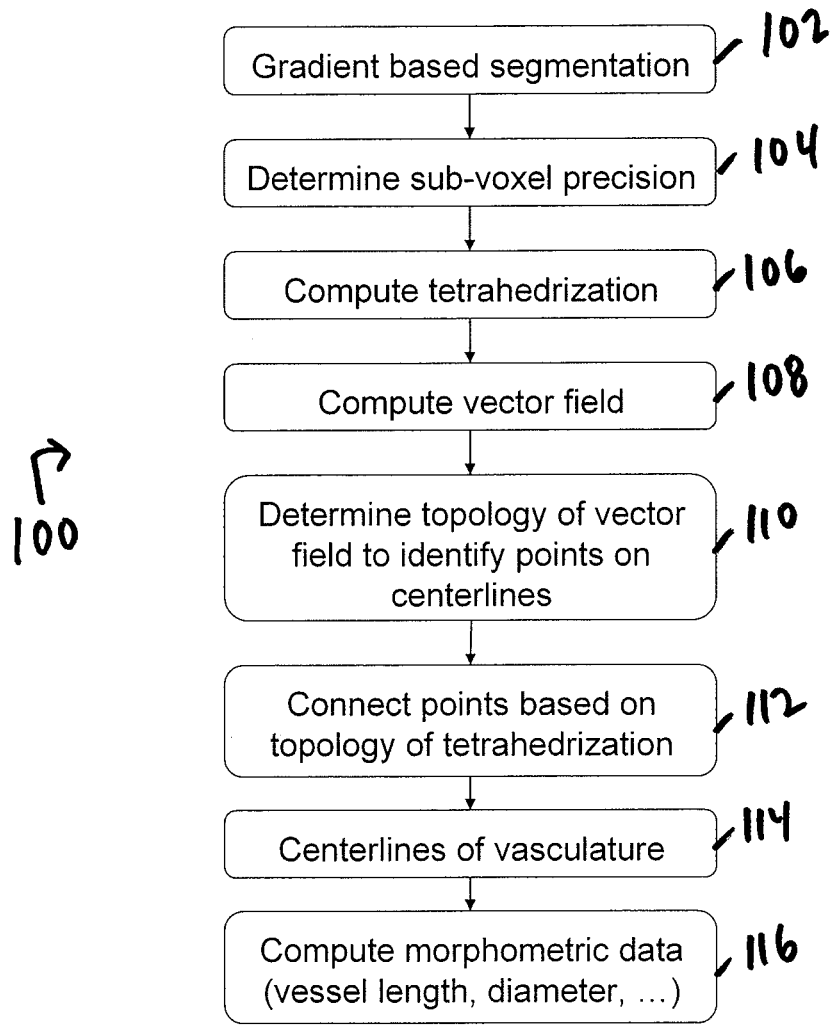
FIG. 1 shows an exemplary flow chart outlining basic steps of an algorithm according to at least one embodiment of the present disclosure.

The disclosure of the present application discloses system and method for extracting vessels from a CT image. For the purposes of promoting an understanding of the principles of the present disclosure, reference will now be made to the embodiments illustrated in the drawings, and specific language will be used to describe the same. It will nevertheless be understood that no limitation of the scope of the present disclosure is thereby intended.

In at least one embodiment of the disclosure of the present application, a method is provided to identify the vessels and determine the centerlines of those vessels, i.e., reducing the vasculature to a stick-like curve-skeleton. In at least one embodiment of the disclosure of the present application, a computer program product that computes the vessel radius at any given point as the distance between the centerline and the vessel wall, as well as the angles between vessels, is provided. Furthermore, the method is validated against manually determined optical measurements of vessel diameters to assess its accuracy.

The algorithm of the present disclosure utilizes a less computationally intensive method of computing the vector field. In addition, the topological analysis of the 2D vector fields within cross-sectional areas of the vessels can be computed more efficiently compared to previous topology-based methods. This allows a system according to the disclosure of the present application to process a CT scanned data set within a few hours which potentially can be further reduced by optimization of the code. In addition, the proposed algorithm does not require the introduction of artificial starting points for the topological analysis. In fact, the singularities defining the centerlines are generated by projecting the vector field onto the cross-sectional areas of the vessels.

According to at least one embodiment of the disclosure of the present application, CT images of coronary arteries are acquired. In one experimental example, five hearts from normal Yorkshire swine of either sex with body weight of 34.3-42.1 kg were studied. The animals were fasted overnight, and ketamine at a dose of 20 mg/kg, and atropine at a dose of 0.05 mg/kg were administered intramuscularly before endotracheal intubation. The animals were ventilated using a mechanical respirator and general anesthesia was maintained with 1-2% isoflurane and oxygen. The chest of each animal was opened through a midsternal thoracotomy, and an incision was made in the pericardium to reach the heart. The animals were then deeply anesthetized followed by an injection of a saturated potassium chloride (KCl) solution through the jugular vein to relax the heart. The aorta was clamped to keep air bubbles from entering the coronary arteries, and the heart was excised and placed in a saline solution. The left anterior descending (LAD) artery, the right coronary artery (RCA) and the left circumflex (LCX) artery were cannulated under saline to avoid air bubbles and perfused with cardioplegic solution to flush out the blood. The three major arteries (LAD, RCA and LCX) were individually perfused at a pressure of 100 mmHg with three different colors of Microfil (MV-112, MV-117, and MV-120, Flow Tech Inc., Carver, Mass.), mixed with Cab-O-Sil (Cabot Corporation, Boston, Mass.) to block the capillaries resulting in the filling of only the arterial tree to precapillary levels. After the Microfil was allowed to harden for 45 to 60 minutes the hearts were refrigerated in saline solution until the day of the CT scan. The scans were made axially (120 mAs 120 kV, 0.6×0.6×1.0 mm) on a 16 slice scanner (Siemens SOMATOM Sensation 16, Siemens Medical Solutions USA, Inc., Malvern, Pa.)

To obtain optical measurements of the vessel trunks after the CT scan was performed, the cast hearts were immersed and macerated in 30% potassium hydroxide solution for three to four days to remove the tissue and obtain a cast of the major coronary arteries and their branches. The trunk of the LAD, RCA and LCX casts were then photographed using a dissection microscope and a Nikon color digital camera. For each photograph, the diameter of the three main trunks were measured at each branch from the proximal artery to where the trunk becomes <1 mm in diameter. The optical measurements of the diameters along the length of the trunk were made using SigmaScan Pro 5 software (Systat Software, Inc., San Jose, Calif.). The measurements were then compared to the values retrieved from the extraction algorithm provided below.

The disclosure of the present application proposes a computer-assisted extraction of morphometric data from one or more CT volumetric images in several steps. At least one embodiment of such a process is shown in FIG. 1, whereby the steps of an exemplary process 100 are provided. The algorithm, described in further detail below, first segments the vessels within the volumetric image based on the image gradients via gradient based segmentation step 102. In order to get a more accurate representation of the vessel boundary, the points resulting from the segmentation step 102 are moved along the gradient direction in such a way that they are located at the maximal gradient via determine sub-voxel precision step 104. This provides a more precise and smoother representation at the sub-voxel level of the boundary compared to using the original voxel locations. The vectors are then computed via compute vector field step 108 for every point on the boundary detected by the previous step in such a way that all vectors are pointing inwards to the center of the vessel. In the simplest case, the image gradients can be used at the boundary. Using a tri-linear interpolation, a vector field covering the inside of the vasculature can be computed after a tetrahedrization of all the boundary points is determined via compute tetrahedrization step 106. Finally, the points on the centerlines are computed using a topological analysis of the vector field within the cross sectional area of the vessels via determine topology step 110 and are connected based on the topology of the tetrahedrization via connect points step 112. This results in a precise representation of the centerlines of all vessels within the volumetric image via centerlines of vasculature step 114. The vessel radii are then computed as the distance between the center and the major boundary. The major trunk defined along the larger diameter at each bifurcation was determined and compared to the manual optical measurements via compute morphometric data step 116. It can be appreciated that the exemplary process 100 described herein may comprise one or more of the aforementioned steps, and is not limited to the specific steps in the order as presented herein.

In practice, the algorithm for extraction of curve-skeletons as disclosed herein consists of several steps as referenced above. Since the vasculature is given as a volumetric image, the boundary is extracted on a gradient threshold. To increase accuracy, the points are then moved along the gradient direction to achieve sub-pixel precision as previously described. The vectors orthogonal to the vascular boundary surface are then determined based on a least-square fit of a plane of a set of neighboring points. The respective normal vectors, or gradient vectors are then computed. Subsequently, the point cloud was tetrahedralized so that the resulting tetrahedra can be used to interpolate the vector field using the previously determined vectors at the vertices. Tetrahedra that were located outside the object are generally not considered when extracting the curve-skeleton. Finally, the topology is determined on every face resulting in points on the curve-skeleton. By connecting the points found within two neighboring tetrahedra, the complete curve-skeleton can be generated and the radii computed as the distance between the centerline and the boundary surface of the vessel. A detailed description of all steps involved in the algorithm is provided herein along with the theoretical foundation for the methodology as disclosed herein.

The choice of the initial threshold of the gradient only influences the smallest vessel detected. Hence, a more optimal choice of this threshold can lead to smaller vessels being visualized (limited by the scanner resolution). However, the location of the vessel boundary that is identified by the algorithm is not influenced by this threshold. As a consequence, choosing a different threshold does not change the quantitative measurements and their accuracy.

To find an optimal threshold, the first step of the algorithm was executed. If sufficient vessel boundaries were not identified, the threshold was decreased. In case of too much noise, the threshold was increased. After few iterations, an appropriate threshold value was found and the same threshold was used for all data sets.

In some instances, the method fails to connect a smaller vessel to the larger branch at the bifurcation. Since the center lines of the vessels are computed properly, the gap closing step is capable of connecting most of these bifurcations properly. Furthermore, a clear definition of a vessel segment is necessary in order to avoid false bifurcations. Since the algorithm of the disclosure of the present application is designed based on topological analysis, a vessel that forks off of a branch is required to have a considerable length in order to be detected. As a result, the presented technique tends to pick up less false bifurcations due to bumps in the vessel boundary compared to algorithms based on Voronoi diagrams. In addition, the present analysis is simplified by casting of the arterial side only without the respective veins.

To perform data and statistical analysis for the five hearts, the position along the RCA, LAD and LCX arteries was normalized with respect to the total length (from the inlet of the artery down to 1 mm in diameter). Hence, the results were expressed in terms of fractional longitudinal position (FLP), ranging from zero to one. The data for both the independent variables (FLP) and dependent variables (diameter) were then divided into 20 equal intervals: 0-0.05, 0.06-0.1, 0.11-0.15 . . . 0.9-0.95, 0.96-1.0. The results were expressed as means±1 SD (standard deviation) over each interval. The root mean square (rms) error and average deviation between computer-based and optical measurements were determined. Paired t-tests for the three trunks separately were used to detect possible differences between groups and intervals. For this, the average measurements of the optical and computer-based methods for all hearts pooled together were used within each interval.

Figure 6:
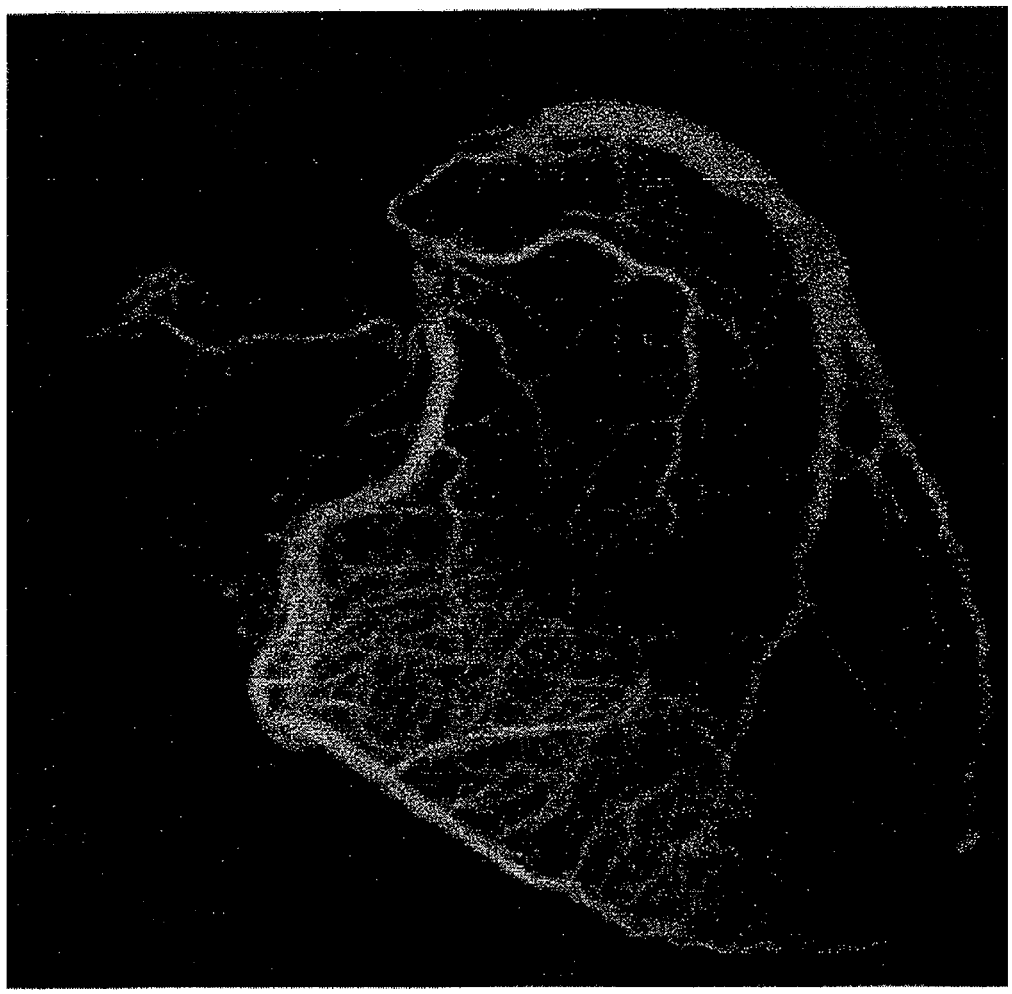
FIG. 6 shows an exemplary volume rendering of a Microfil perfused porcine heart scanned using a CT scanner according to at least one embodiment of the present disclosure.
Figure 8A:
FIG. 8A shows a sub-section of the porcine heart data set visualized as a volume rendered image according to at least one embodiment of the present disclosure.
Figure 8B:
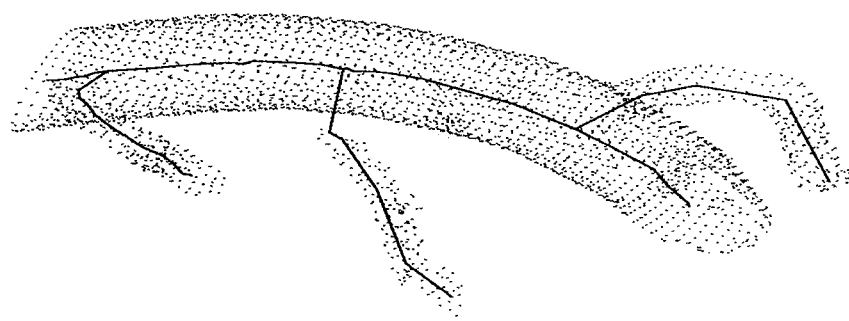
FIG. 8B shows a sub-section of the porcine heart data set visualized as an extracted curve-skeleton according to at least one embodiment of the present disclosure.

The algorithm of the present disclosure was first validated on a simple, computer-generated phantom data-set that included a tubular-shaped object. Since the data set was computer-generated, the location of the centerlines and the diameters were known and any effects of the scanning step were avoided. The centerline was extracted and the radii determined. This test indicated that both the centerlines as well as the diameters were extracted accurately at an average error of 0.7% and rms error of 0.03%. For true validation, the coronary arterial CT images were used, as shown in FIG. 6, referenced in further detail herein. The proposed algorithm extracted the curve-skeleton from the volumetric data set to identify the centerlines of the vessels and to extract morphometric data. The extracted curve-skeleton describes the centerlines of the arterial vessels found within the data set. When using a sub-section of the porcine coronary image, it can be seen that the curve-skeleton is well defined and located at the center of the arterial vessels, as shown in FIG. 8B referenced in further detail herein. Based on the centerlines, the vessel lengths were determined as the length of the centerline while the vessel radii were computed as the distance between the centerline and the vessel wall. The overall lengths of the main trunks measured from the beginning of the most proximal artery to the end of approximately 1 mm diameter vessel ranged from 8.4 cm to 10.7 cm for LCX, 10 cm to 13.8 cm for LAD, and 11.2 cm to 18.7 cm for RCA. The average diameters for LAD, LCX and RCA were determined as 2.52 mm, 2.78 mm and 3.29 mm, respectively.

Figure 2A:
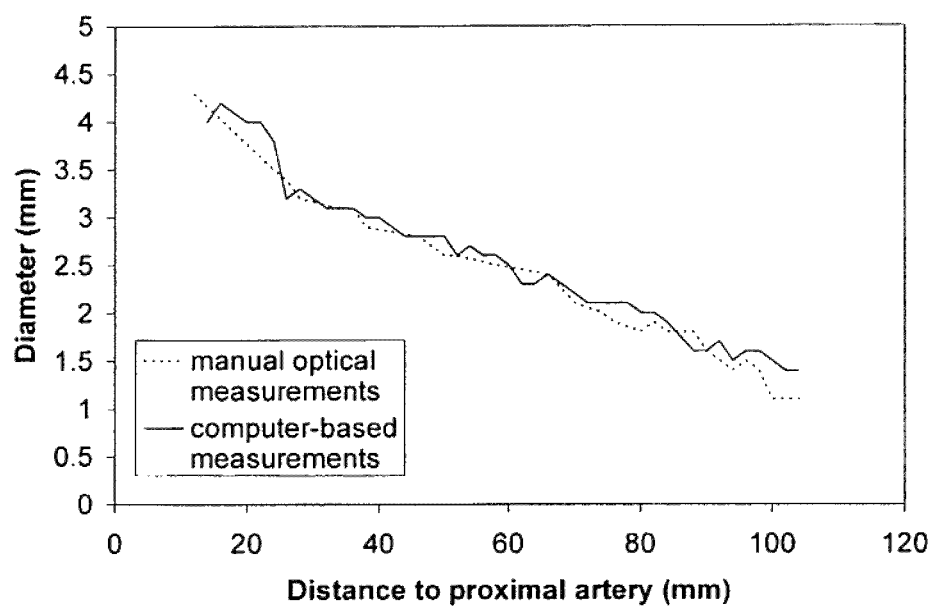
FIGS. 2A, 2B, and 2C show direct comparisons for typical specimens between manually measured and computed diameters for the LAD artery, the LCX artery, and the RCA, respectively, according to at least one embodiment of the present disclosure.
Figure 2B:
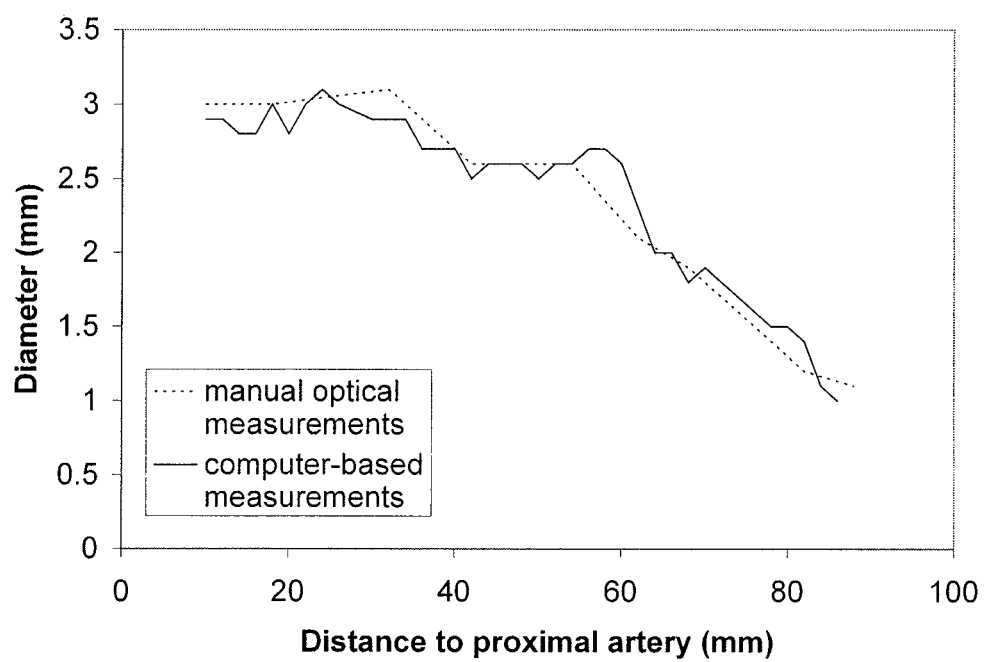
Figure 2C:
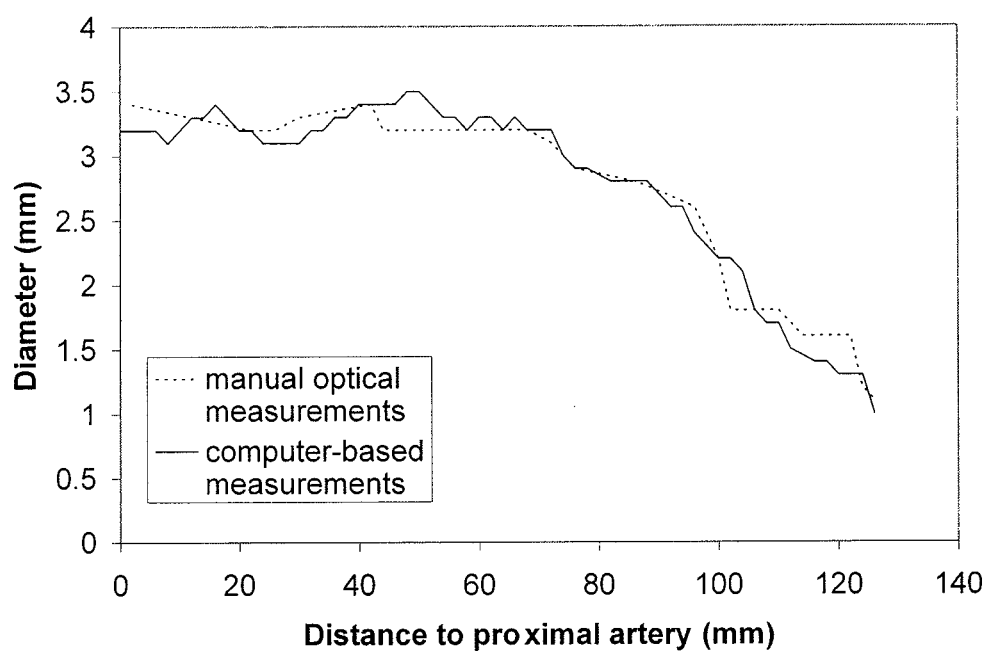

In order to validate the results derived from the CT images, the manual optical measurements were compared to the computed values for the main trunks of the LAD, LCX, and RCA branches. The direct comparison of the diameter values retrieved by extracting the three vessel branches from the CT scanned images and the optical measurements using the cast polymer verify the accuracy of the algorithm disclosed herein. FIG. 2A shows a typical example of the LAD trunk for one representative heart according to at least one embodiment of the disclosure of the present application. As can be seen from the two curves, the diameters that were manually measured (dashed line) correspond with the diameters determined by the software system (solid lines) very well. Computer-based CT and optical measurements are both plotted together in this graph. The length of this branch down to the point of scan resolution (~1 mm) was 9.9 cm. Once the diameter is <1 mm, the agreement is less satisfactory. This is not surprising since the voxel resolution of the CT scan is about 0.6 mm within the slices and 1.0 mm between slices. Hence, the accuracy of diameters below 1 mm are somewhat questionable since they would be described by less than a single voxels within the volumetric image. No statistically significant differences exist between the two measurements ($p>0.05$). FIGS. 2B and 2C show the results for the LCX and RCA branch of the same heart, respectively, according to at least one embodiment of the disclosure of the present application. The lengths of these branches were 8.4 cm and 11.4 cm, respectively. According to paired t-test, the p-values for the three major trunks were 0.23 (LAD), 0.76 (LCX), and 0.64 (RCA). The distance to the proximal artery was used as a reference to compare the optical diameter measurements to the image-extracted values.

Figure 3A:
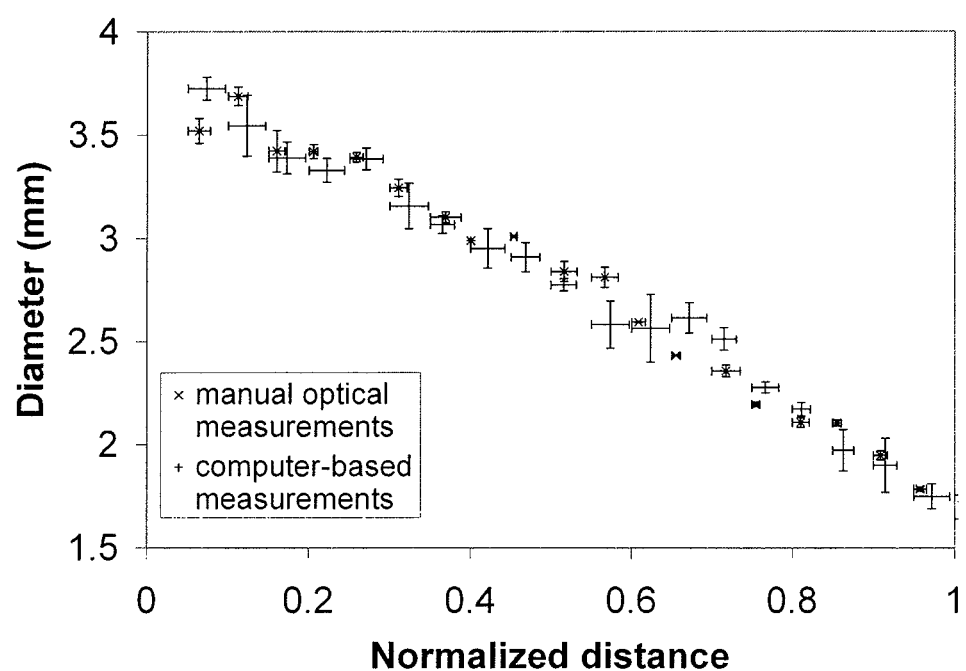
FIGS. 3A, 3B, and 3C show comparisons between the manually measured and computed diameters for a series of specimens with respect to the LAD artery, the LCX artery, and the RCA, respectively, according to at least one embodiment of the present disclosure.
Figure 3B:
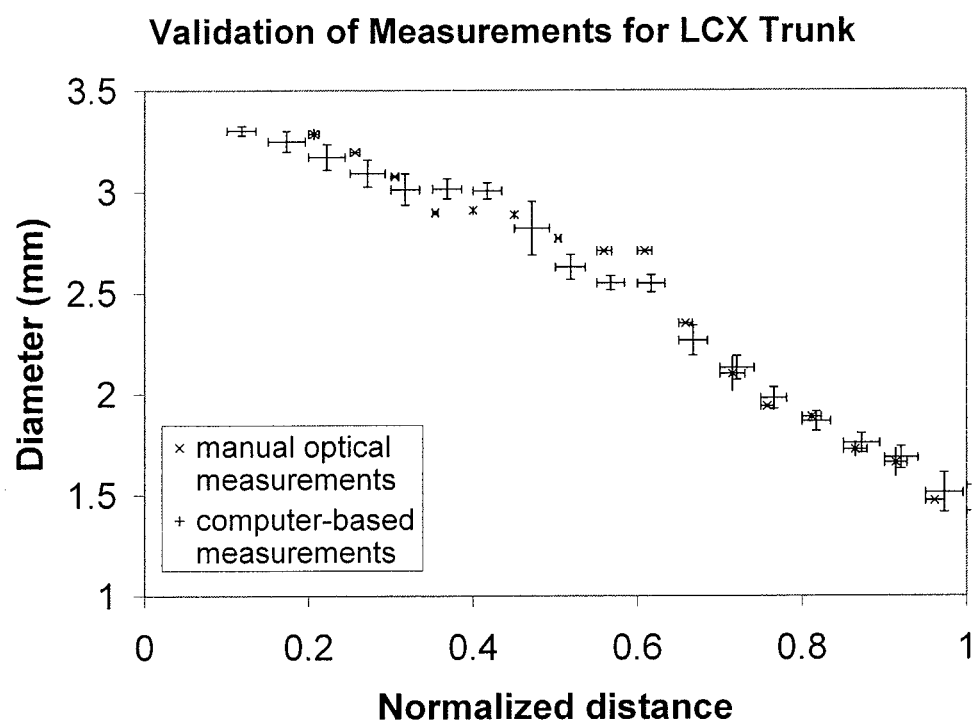
Figure 3C:
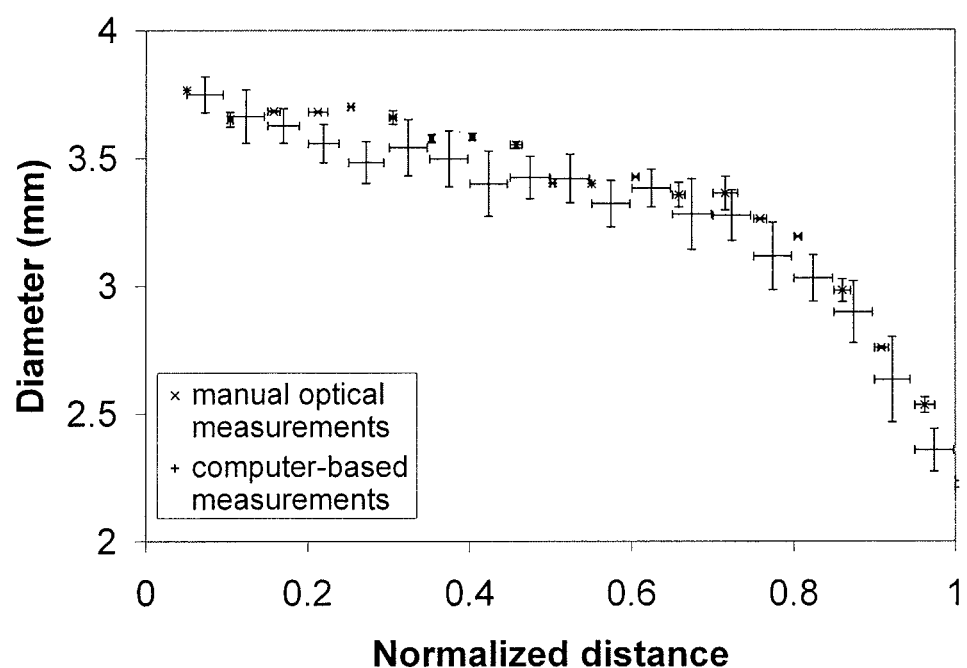

In order to facilitate a direct comparison between the manually measured data and the computed values, the data were normalized along the length to a scale between zero and one. The inlet of the artery was identified as zero, while the point at which the trunk reached 1 mm diameter was set to one. FIGS. 3A-3C show a comparison of the manually measured (x) and computer-based (+) diameters for all five hearts. The horizontal bars represent the standard deviation (SD) within each bin with respect to the measured lengths. Similarly, the SD of diameter values within each bin is shown as a vertical bar. The computer-based algorithm sampled more measurements as compared to the optical method. As a result, there is a larger variation in the FLP for the computer-based method. As can be seen from FIGS. 3A-3C, the manually measured diameters agree very well with the computer-generated values. There were no statistically significant differences between the two sets of measurements at each interval (paired t-test per interval $p>0.05$, averaged for all five hearts). Furthermore, the rms error between the two measurements of all vessels is 0.16 mm (0.21 mm for LAD, 0.14 mm for LCX, and 0.11 mm for RCA) which is <10% of the mean average value with average deviation of 0.08 mm (0.11 mm for LAD, 0.08 mm for LCX, and 0.05 mm for RCA). The rms error of the measurements computed using the presented technique of 0.16 mm are also more precise compared to other techniques found in the literature, where the rms error ranges from 0.2-0.6 mm with scans of similar resolutions (0.6×0.6×0.6 mm).

Regarding the computer-assisted extraction of morphometric data from CT volumetric images, an exemplary system of the disclosure of the present application is provided. The proposed software system uses a Gaussian matrix to compute the image gradients. Therefore, the resulting gradients are smoothed to reduce any remaining noise in the boundary representation. This also reduces the error that occurs whenever gradients are computed close to gaps within the vessel boundary. Due to the use of vector field topology methods for determining center points, the algorithm tends to be less sensitive to errors in the gradients as compared to methods that project the boundary onto the center points directly. In the analysis disclosed herein, gaps within the vessel boundary only occurred for very small vessels with diameters close to the size of a voxel due to partial volume effects. It should be noted that all three methods result in vectors pointing to the inside of the object.

Referring now to FIG. 9, there is shown a diagrammatic view of an embodiment of morphometric data extraction system 900 of the present disclosure. In the embodiment shown in FIG. 9, morphometric data extraction system 900 comprises user system 902. In this exemplary embodiment, user system 902 comprises processor 904 and one or more storage media 906. Processor 904 operates upon data obtained by or contained within user system 902. Storage medium 906 may contain database 908, whereby database 908 is capable of storing and retrieving data. Storage media 906 may contain a program (including, but not limited to, database 908), the program operable by processor 904 to perform a series of steps regarding morphometric data as described in further detail herein. By way of example, the program may be operable by processor 904 to analyze morphometric data, including the analysis of such data in accordance with the equations and formulas described herein.

Any number of storage media 906 may be used with morphometric data extraction system 900 of the present disclosure, including, but not limited to, one or more of random access memory, read only memory, EPROMs, hard disk drives, floppy disk drives, optical disk drives, cartridge media, and smart cards, for example. As related to user system 902, storage media 906 may operate by storing morphometric data for access by a user and/or for storing computer instructions. Processor 904 may also operate upon data stored within database 908.

Regardless of the embodiment of morphometric data extraction system 900 referenced herein and/or contemplated to be within the scope of the present disclosure, each user system 902 may be of various configurations well known in the art. By way of example, user system 902, as shown in FIG. 9, comprises keyboard 910, monitor 912, and printer 914. Processor 904 may further operate to manage input and output from keyboard 910, monitor 912, and printer 914. Keyboard 910 is an exemplary input device, operating as a means for a user to input information to user system 902. Monitor 912 operates as a visual display means to display the morphometric data and related information to a user using a user system. Printer 914 operates as a means to display morphometric data and related information. Other input and output devices, such as a keypad, a computer mouse, a fingerprint reader, a pointing device, a microphone, and one or more loudspeakers are contemplated to be within the scope of the present disclosure. It can be appreciated that processor 904, keyboard 910, monitor 912, printer 914 and other input and output devices referenced herein may be components of one or more user systems 902 of the present disclosure.

It can be appreciated that morphometric data extraction system 900 may further comprise one or more server systems 916 in bidirectional communication with user system 902, either by direct communication (shown by the single line connection on FIG. 9), or through a network 918 (shown by the double line connections on FIG. 9) by one of several configurations known in the art. Such server systems 916 may comprise one or more of the features of a user system 902 as described herein, including, but not limited to, processor 904, storage media 906, database 908, keyboard 910, monitor 912, and printer 914, as shown in the embodiment of morphometric data extraction system 900 shown in FIG. 9. Such server systems 916 may allow bidirectional communication with one or more user systems 902 to allow user system 902 to access morphometric data and related information from the server systems 916. It can be appreciated that a user system 902 and/or a server system 916 referenced herein may be generally referred to as a "computer."

In addition, and regarding the computer-assisted extraction of morphometric data from CT volumetric images, and before illustrating the algorithm used to extract quantitative information from the CT scanned volumetric images, the theoretical foundation of the methodology will be outlined. Hence, the next sections briefly summarize the main ideas of 2D vector field topology.

Regarding topological analysis of vector fields, the algorithm described herein uses the topology of a vector field defined on the faces of a tetrahedralized set of points. Thus, the vector field is defined by three vectors located at the vertices of a triangle. The vector field inside the triangles is interpolated linearly by computing the barycentric coordinates of the point within the triangle. These coordinates are then used as weights for linearly combining the three vectors defined at the vertices of the triangle to compute the interpolated vector. The advantage of such a linear interpolation is an easier classification of topological features as described as follows.

Critical points are an important feature from a topological point of view since they are used as starting points for the topological analysis. Let v be a given vector field v: $W \rightarrow R^3$ with $W \subset R^3$ as defined on a face of a tetrahedron. Let further $x_0 \in W$ be a point where the vector field vanishes, i.e. $v(x_0)=0$. Then $x_0$ is considered a critical point of the vector field v. Several terms are used synonymously for critical points, including, but not limited to, singularities, singular points, zeros, or equilibrium. In topological analysis, the zeroes of the interpolating vector field are of particular interest. Based on the eigenvalues of the matrix of the interpolating vector field, these critical points can be separated into different groups. Within each group, the vector field assumes similar characteristics. Due to the fact that linear interpolation is used to interpolate across a face of a tetrahedron; i.e., a triangle, the vector field v can be described in this case by a matrix and a displacement vector. Therefore, a linear map $A:W \rightarrow R^3$ described by the 3×3 matrix A and a vector $b \in R^3$ can be found such that it describes the given vector field v (i.e., $v(x)=Ax+b$ for all $x \in W$. Then, singularities can be identified by directly solving the equation $Ax+b=0$. There cannot be more than one singularity located within one triangle when using linear interpolation. For the case b=0, one considers the vector field described by Ax homogenous linear. Without loss of generality, one may assume homogenous linear vector fields in the further discussion of the theory of vector field topology throughout the present disclosure.

Singularities can be classified using the eigenvalues of the interpolating matrix A regarding their property of attracting or repelling the surrounding flow. If all eigenvalues have negative real parts, the singularity is considered a sink which attracts the surrounding flow. On the other hand, if all eigenvalues have positive real parts, the singularity is a source that repels the surrounding flow. A proof for this classification can be found in a treatise by Hirsch and Smale (*Differential equations, dynamical systems and linear algebra*. Academic Press, 1974). Further analysis of matrix A leads to several types of vector fields distinguished by their major properties of the flow, i.e., the behavior of the streamlines within this vector field. In order to compute a streamline, the Cauchy problem has to be solved with initial problem $x(o)=k$, $k \in R^3$:

$$\frac{d}{dt}x(t) = Ax(t) \tag{1}$$

It can be proven that the solution to the Cauchy problem for a linear vector field can be described by an exponential function:

$$x = e^{tA}k \tag{2}$$

with $$e^A = \sum_{i=0}^{\infty} \frac{A^i}{i!}$$

Different categories of vector fields can then be distinguished based on whether the matrix A is diagonalizable. This leads to three main categories which are described below.

Regarding the linear vector fields of type 1, the matrix A is diagonalizable, i.e., the eigenvalues $\lambda$ and $\mu$ are real. Thus, it is similar to a matrix B where there exists an invertible matrix P with $B=PAP^{-1}$, of the following structure:

$$B = \begin{pmatrix} \lambda & 0 \\ 0 & \mu \end{pmatrix} \tag{3}$$

Due to the structure of the matrix B, a streamline x(t) with initial condition $k=(k_1, k_2)$ can be computed in a vector field described by such a matrix using the following formula:

$$x(t) = \begin{pmatrix} e^{1\lambda}k^1 \\ e^{1\mu}k_2 \end{pmatrix} \quad (4)$$

Figure 4A:
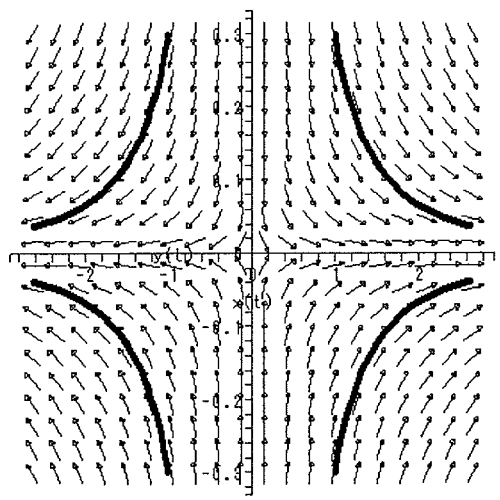
FIG. 4A shows a saddle singularity of a vector field including surrounding flow according to at least one embodiment of the present disclosure.
Figure 4B:
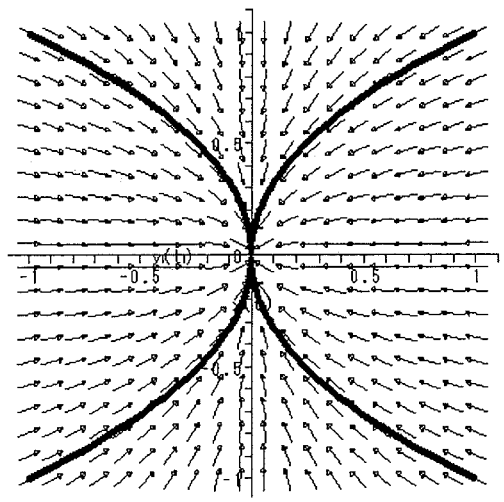
FIG. 4B shows a node singularity of a vector field including surrounding flow according to at least one embodiment of the present disclosure.
Figure 4C:
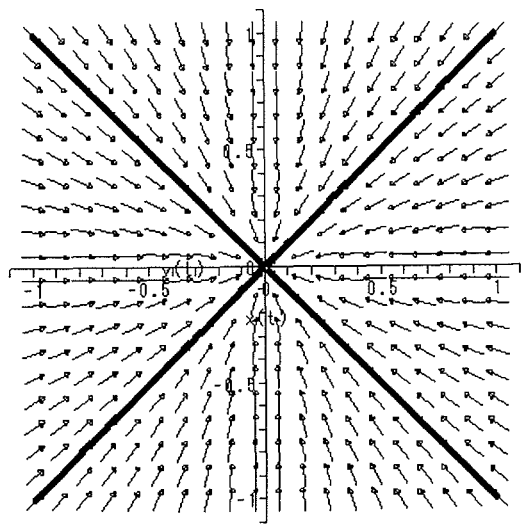
FIG. 4C shows a focus singularity of a vector field including surrounding flow according to at least one embodiment of the present disclosure.

By computing streamlines we generate a phase portrait of the different cases of vector fields within this category. Three different types are possible as distinguished by the eigenvalues of the interpolating matrix A. The first case, where $\lambda > 0 > \mu$, results in a saddle singularity. An example saddle singularity is depicted in FIG. 4A. The second case, described by an eigenvalue configuration of $\lambda < \mu < 0$, described a node singularity as shown in FIG. 4B. The last case with two identical eigenvalues is the focus singularity. FIG. 4C shows a focus singularity with $\lambda = \mu < 0$. The examples shown here are mainly of sinks.

However, the same types of singularities may occur with sources. The only difference is in the sign of the eigenvalues, i.e., multiplying the eigenvalues by −1 results in the same singularities as sources by simply reversing the flow.

Regarding the linear vector fields of type 2, the two eigenvalues of the matrix A have a non-imaginary part, i.e., A is similar to the following matrix:

$$B = \begin{pmatrix} a & -b \\ b & a \end{pmatrix} \quad (5)$$

When substituting the values a and b in the above matrix by introducing new values $\theta$ and r, namely, $$r = \sqrt{a+b^2} \quad (6)$$

$$\theta = \arccos(a/r)$$

the matrix B can be rewritten as follows:

$$B = \begin{pmatrix} a & -b \\ b & a \end{pmatrix} = \begin{pmatrix} r & 0 \\ 0 & r \end{pmatrix} \cdot \begin{pmatrix} \cos\theta & -\sin\theta \\ \sin\theta & \cos\theta \end{pmatrix} \quad (7)$$

A vector field described by such a matrix has a strong rotational component. Consequently, a streamline x(t) with initial condition $k = (k_1, k_2)$ may be computed using the following formula:

$$x(t) = e^{ta} \cdot \begin{pmatrix} k_1 \cos(tb) - k_2 \sin(tb) \\ k_1 \sin(tb) + k_2 \cos(tb) \end{pmatrix} \quad (8)$$

Figure 4D:
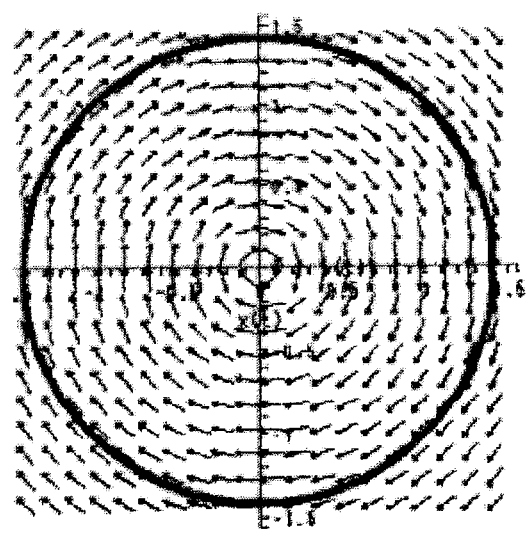
FIG. 4D shows a center singularity of a vector field including surrounding flow according to at least one embodiment of the present disclosure.
Figure 4E:
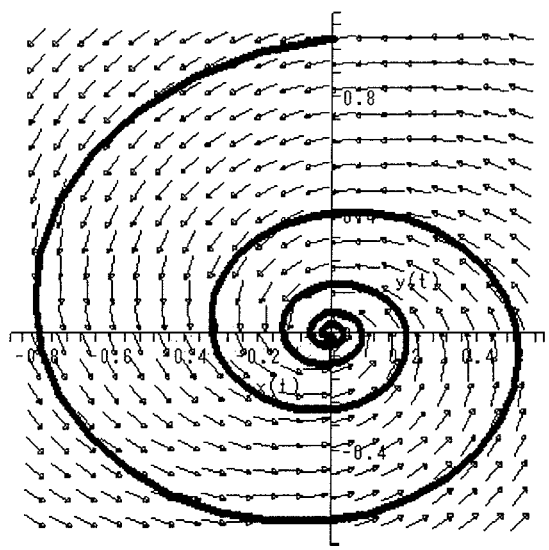
FIG. 4E shows a spiral singularity of a vector field including surrounding flow according to at least one embodiment of the present disclosure.

A center singularity results if a=0 which is described by a phase portrait that consists of streamlines forming concentric circles with the singularity as their center. An example center singularity diagram is shown in FIG. 4D. Otherwise, a spiral singularity is described with streamlines spiraling around the singularity and then eventually ending up at the singularity itself may result, an example of which shown in FIG. 4E.

Regarding the linear vector fields of type 3, if the matrix A is not diagonalizable and the two eigenvalues are equal ($\lambda = \mu$), then A is similar to the following matrix:

$$B = \begin{pmatrix} \lambda & 0 \\ 1 & \lambda \end{pmatrix} \quad (9)$$

By splitting up the matrix B into two components, we obtain:

$$B = \begin{pmatrix} \lambda & 0 \\ 1 & \lambda \end{pmatrix} = \lambda \begin{pmatrix} 1 & 0 \\ 0 & 1 \end{pmatrix} + \begin{pmatrix} 0 & 0 \\ 1 & 0 \end{pmatrix} \quad (10)$$

It can be shown that a streamline with initial condition $k = (k_1, k_2)$ integrated through such a vector field can be described by:

$$x(t) = e^{t\lambda} \cdot \begin{pmatrix} k_1 \\ k_1 t + k_2 \end{pmatrix} \quad (11)$$

Figure 4F:
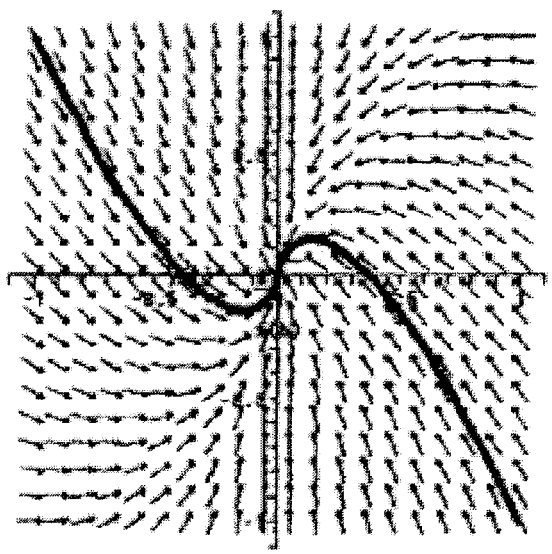
FIG. 4F shows an improper node singularity of a vector field including surrounding flow according to at least one embodiment of the present disclosure.

This case resembles an improper node singularity as depicted in FIG. 4F.

Regarding topological analysis, the topological graph (or simply "topology") of a vector field describes the structure of the flow or phase portrait. Separatrices are used to separate the areas of the flow into regions with similar behavior. Separatrices may be computed by integrating streamlines emerging from saddle singularities in direction of the eigenvalues of the interpolating matrix. The topological graph then consists of the singularities and the separatrices. More complex topological features exist, such as closed streamlines, which can act similarly to singularities due to their attracting or repelling properties.

Regarding the methodology for extracting quantitative information, the algorithm for determining the curve-skeleton consists of several steps. Since the object is given as a volumetric CT-scanned image, the object boundary must be extracted first. Then, a vector field is computed that is orthogonal to the object's boundary surface. Once the vector field is computed, the curve-skeleton can be determined by applying a topological analysis to this vector field. In a last optional step, gaps between segments of the curve-skeleton can be closed automatically. The following paragraphs explain these steps in detail.

Regarding the extraction of an object boundary, the CT-scanned vasculature is defined by a volumetric image. A volumetric image consists of voxels aligned along a regular 3D grid. It is generally not likely that the boundaries of the vessels are exactly located at these voxels. Hence, better precision can be achieved by finding the exact location in between a set of voxels. Since an accurate representation of the object boundary is crucial to the algorithm, improvement of the precision is an essential step. The method used within the described system uses similar techniques as described by Canny's non-maxima suppression but extended to three dimensions.

Figure 5A:
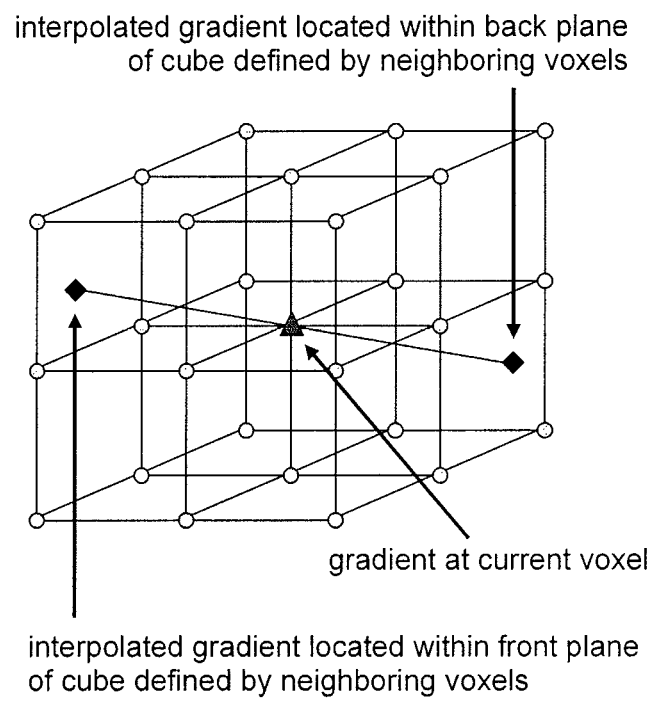
FIG. 5A shows an exemplary determination of the sub-voxel precision of a voxel and its neighboring voxels according to at least one embodiment of the present disclosure.

First, the image gradients are computed. Using a fixed threshold, all voxels with a gradient length below this threshold are neglected. The gradients of the remaining voxels are then compared to their neighbors to identify local maxima along the gradient. In 3D, the direct neighborhood of a single voxel generally consists of 26 voxels forming a cube that surrounds the current pixel. In order to find the local maximum along the current gradient, the gradients of the neighboring voxels in positive and negative directions have to be determined. When using 2D images, nearest neighbor interpolation of these gradients may work but yield incorrect results in a 3D volumetric image. Therefore, the gradients on the boundary of the cube formed by the neighboring voxels are interpolated linearly to determine a better approximation of the desired gradients. The example shown in FIG. 5A explains this in more detail where the current voxel marked as a triangle and the direct neighbors forming a cube are shown. The current gradient is extended to the faces of the cube starting at the current voxel. The resulting intersections, marked as, diamonds, define the locations for which the gradients have to be interpolated so that the maximal gradient can be determined. The current implementation of the described system uses linear interpolation. The best results can be achieved by the use of an anisotropic diffusion filter. The five data sets used in this study were not pre-filtered.

Figure 5B:
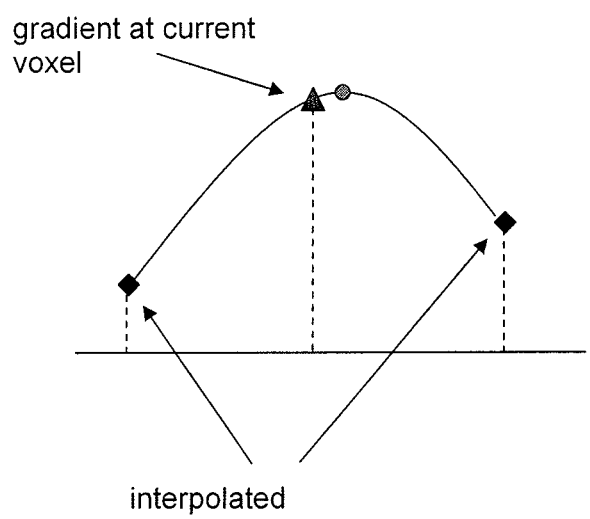
FIG. 5B shows an exemplary computation of the local maximum for the gradient according to at least one embodiment of the present disclosure.

Once the neighboring gradients in positive and negative direction of the current gradient are computed, these are compared in order to find the local maxima. Thus, if the length of the current gradient is larger than the length of both of its neighbors the local maximum can be calculated similar to the 2D case. When interpolated quadratically, the three gradients together form a parabolic curve along the direction of the current gradient as shown in FIG. 5B. In general, the current gradient is larger than the interpolated neighbors since only local maxima were considered in this step. Hence, the local maximum can be identified by determining the zero of the first derivative of the parabolic curve. Determining all local maxima within the volumetric image in this fashion then results in a more accurate and smoother approximation of the object boundary with sub-voxel precision. Once all points on the boundary are extracted from the volumetric image using this gradient approach with sub-voxel precision, the resulting point cloud can be further processed in order to identify the curve-skeleton.

Regarding the determination of a vector field, the method disclosed herein computes a curve-skeleton by applying a topological analysis to a vector field that is determined based on the geometric configuration of the object of which the curve-skeleton is to be determined. The vector field is computed at the identified points on the vessel boundary in such a way that the vectors are orthogonal to the vessel boundary surface. Based on these vectors, the vector field inside the vessels is computed using linear interpolation.

Different approaches are possible for calculating such a vector field. A repulsive force field can be determined that uses the surrounding points on the object's boundary surface. The repulsive force is defined similarly to the repulsive force of a generalized potential field. The basic idea is to simulate a potential field that is generated by the force field inside the object by electrically charging the object boundary. Alternatively, we may define a normal vector and the respective plane. The normal of this plane then defines the orthogonal vector corresponding to the current point.

Since these are volumetric data sets, the image gradients can be used to define the vectors on the boundary surface. These image gradients are previously determined as they are needed for extraction of the boundary. Since the points are only moved along the direction of the image gradient when determining the sub-voxel precision, this image gradient is still orthogonal to the boundary surface and therefore represents a good approximation for the desired vector field. Note that all three methods result in vectors pointing to the inside of the object.

Figure 8C:
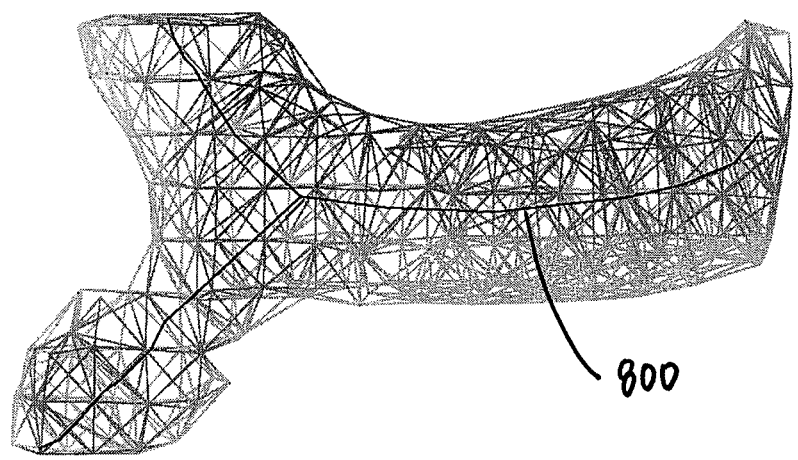
FIG. 8C shows an example tetrahedrization with outside tetrahedra removed according to at least one embodiment of the present disclosure.

Regarding the determination of a curve-skeleton, and in order to determine the curve-skeleton of the object, a tetrahedrization of all points on the object boundary is computed first. For this, Si's fast implementation of a Delaunay tetrahedrization algorithm is used (*A quality tetrahedral mesh generator and three-dimensional Delaunay triangulator. WIAS Technical Report* No. 9, 2004). This algorithm results in a tetrahedrization of the entire convex hull defined by the set of boundary points. Thus, it includes tetrahedra that are located completely inside the vessels but also tetrahedra that are completely outside of the vessels and connect two vessels. By using the previously computed vectors that point to the inside of the vasculature, outside tetrahedra can be distinguished from tetrahedra that are located inside the vessels. Hence, all outside tetrahedra can be removed, leaving a Delaunay tetrahedrization of the inside of the vasculature only. Note that this step also closes small gaps that may exist since tetrahedra covering these gaps will still have vectors attached to the vertices which point inward. Since vectors are known for each vertex of every tetrahedron, the complete vector field can be computed using this tetrahedrization by linear interpolation within each tetrahedron. This vector field is then used to identify points of the curve-skeleton which are then connected with each other. The vectors of the remaining tetrahedra are non-zero (the tetrahedron would be removed otherwise). Thus, the trivial vector field where the vectors are zero inside the entire tetrahedron does not occur. FIG. 8C shows an example of the tetrahedrization in accordance with the disclosure of the present application with outside tetrahedra removed as previously described for a small vessel with a diameter of about three voxels. Based on this tetrahedrization and associated vector field, center lines 800 can be identified.

Once the vector field is defined within the entire object, one could use an approach similar to the one used by Cornea et al. and compute the 3D topological skeleton of the vector field which yields the curve-skeleton of the object. Since singularities are very rare in a 3D vector field, Cornea et al. introduced additional starting points for the separatrices, such as low divergence points and high curvature points, to obtain a good representation of the curve-skeleton. Therefore, a different approach is described herein that analyzes the vector field on the faces of the tetrahedra.

In order to perform a topological analysis on the faces of the tetrahedra, the vector field has to be projected onto those faces first. Since tri-linear interpolation is used within the tetrahedra, it is sufficient to project the vectors at the vertices onto each face and then interpolate linearly within the face using these newly computed vectors. Based on the resulting vector field, a topological analysis can be performed on each face of every tetrahedron.

Figure 8D:
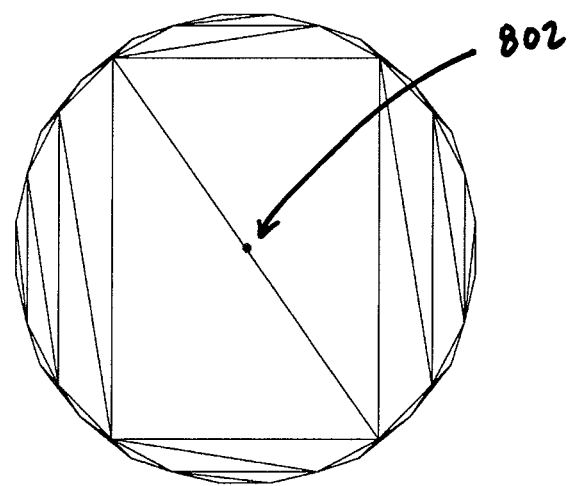
FIG. 8D shows an example of a cross-section of a cylindrical object according to at least one embodiment of the present disclosure.

Points on the curve-skeleton can be identified by computing the singularities within the vector field interpolated within every face of the tetrahedrization. For example, for a perfectly cylindrical object, the vector boundary points directly at the center of the cylinder. When examining the resulting vector field at a cross section of the cylinder, a focus singularity is located at the center of the cylinder within this cross section. The location of this focus singularity resembles a point on the curve-skeleton of the cylinder. Hence, a singularity within a face of a tetrahedron indicates a point of the curve-skeleton. Since the vectors at the boundary point inwards, only sinks need to be considered in order to identify the curve-skeleton. Since not all objects are cylindrical in shape and given the numerical errors and tolerances, points on the curve-skeleton can be identified from sinks (i.e., attracting singularities) that resemble focus and spiral singularities. FIG. 8D illustrates an example for a cylindrical object for which a cross-section (a slice perpendicular to the object) is shown in accordance with the disclosure of the present application. There are two large triangles that connect two opposite sides of the object. Based on these triangles, which resemble faces of tetrahedra of the tetrahedrization, center point 802 can be identified based on the topological analysis within these triangles.

Obviously, only faces that are close to being a cross-section of the object should be considered in order to identify points on the curve-skeleton. To determine such cross-sectional faces, the vectors at the vertices can be used. If the vectors at the vertices, which are orthogonal to the object boundary, are approximately coplanar with the face, then this face describes a cross section of the object. As a test, the scalar product between the normal vector of the face and the vector at all three vertices can be used. If the result is smaller than a user-defined threshold, this face is used to determine points on the curve-skeleton. If we compute the singularity on one of these faces, then we obtain a point which is part of the curve-skeleton. Note that since linear interpolation is used within the face, only a single singularity can be present in each face. In case of bifurcations, there will be two neighboring tetrahedra which contain a singularity, one for each branch. Additionally, this approach disregards boundary points which are based on noise voxels. In order for a set of boundary points to be considered, they need to have gradient vectors that point towards the center from at least three different directions. Hence, boundary points based on noise voxels are automatically neglected because it is very unlikely that there are other corresponding boundary points in the vicinity with gradient vectors pointing in the direction of the first boundary point.

After computing the center points, the vessel diameters are computed for each center point and all points within the vicinity are identified. From this set of points, only the ones that are within the slice of the vessel used to determine the center point are selected to describe the boundary. The radius is then computed as the average of the distances between the center points and the points on the boundary of the vessel slice.

Once individual points of the curve-skeleton (including the corresponding vessel diameters) are computed by identifying the focus and spiral singularities within the faces of the tetrahedra, this set of points must be connected in order to retrieve the entire curve-skeleton. Since the tetrahedrization describes the topology of the object, the connectivity information of the tetrahedra can be used. Thus, identified points of the curve-skeleton of neighboring tetrahedra are connected with each other forming the curve-skeleton. In some cases, gaps will remain due to the choice of thresholds which can be closed using the method described herein.

Regarding closing gaps within the curve-skeleton, and due to numerical tolerances, sometimes gaps may occur between parts of the curve-skeleton which can be filled automatically. Since the tetrahedrization of the points on the object's boundary describe only the inside of the object, the algorithm can search for loose ends of the curve-skeleton and connect these if they are close to each other. In addition, it is verified that the connection stays within the object; i.e., if it is completely covered by tetrahedra. To test this, those tetrahedra which are close to the line connecting the two candidates and potentially filling a gap are identified. Then, the algorithm computes how much of the line is covered by those tetrahedra; i.e., what fraction of the line is contained within the tetrahedra. If all those fractions add up to one, then the line is completely within the object and is a valid connection filling a gap of the curve-skeleton.

The algorithm for extracting curve-skeletons consists basically of several steps. Since the vasculature is given as a volumetric image its boundary needs to be extracted from the volumetric image based on a gradient threshold. To increase accuracy, the points are moved along the gradient direction to achieve sub-pixel precision as previously described. Then, vectors orthogonal to the vascular boundary surface need to be determined. These can be derived from a least-square fit of a plane of a set of neighboring points and then use its normal vector, or the gradient vectors since the vasculature is defined by a volumetric image. Subsequently, the point cloud is tetrahedralized so that the resulting tetrahedra can be used to interpolate the vector field using the previously determined vectors at the vertices. Tetrahedra that are located outside the object are not considered when extracting the curve-skeleton. Finally, the topology can be determined on every face resulting in points on the curve-skeleton. By connecting the points found within two neighboring tetrahedra, the complete curve-skeleton is generated as a last step and the diameters computed as the distance between the centerline and the boundary surface of the vessel.

Figure 7:
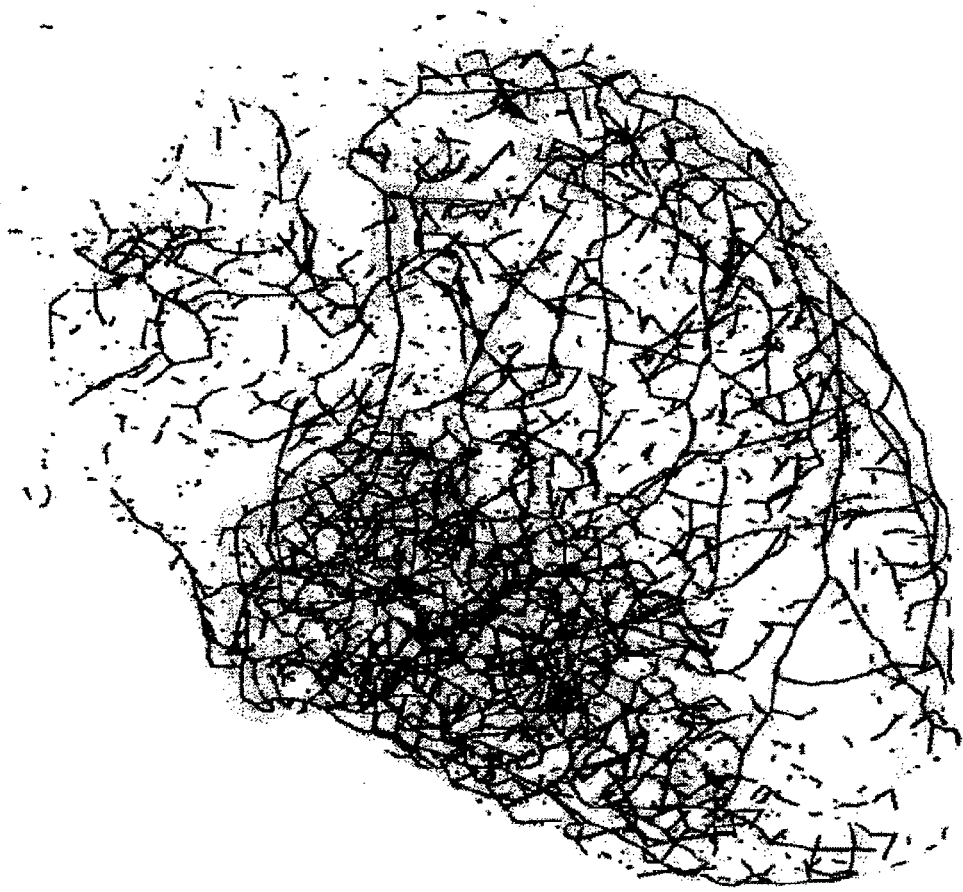
FIG. 7 shows an exemplary curve-skeleton of the porcine heart data set according to at least one embodiment of the present disclosure.

The algorithm was tested on a coronary arterial CT image as shown in FIG. 6. The proposed algorithm can extract the curve-skeleton from the volumetric data set in order to identify the centerlines of the vessels. The resulting curve-skeleton is depicted in FIG. 7. The figure shows the curve-skeleton as well as the point set defining the vascular boundary which was used to find the curve-skeleton. Due to the densely located vessels of the RCA tree, the extracted curve-skeleton seems rather cluttered and it is difficult to distinguish between lines at different depths. The extracted curve-skeleton, however, exactly describes the centerlines of the arterial vessels found within the data set. When using a sub-section of the porcine coronary image (shown in FIG. 8A), it can be seen that the curve-skeleton is well defined and located at the center of the arterial vessels (as shown in FIG. 8B).

The method disclosed herein accurately extracts vascular structures including dimensions (diameters and lengths) from volumetric images. The validation of the computed diameters with optical measurements confirms the accuracy of the method. The algorithm can extract the main trunk as well as the entire vascular tree within the scan resolution. The disclosure of the present application may be applied to other images and structures in addition to vascular trees. For example, the present method may be used to study the microstructure of vessel wall (elastin and collagen). Multi-photon microscopy can be used to visualize elastin and collagen fibers separately. The segmentation scheme outlined here can also allow us to reconstruct the fiber structure quantitatively. Many other applications are apparent to one having ordinary skill in the art after consideration of the present disclosure. Such other applications are also within the scope of the disclosure of the present application.

The foregoing disclosure of the exemplary embodiments of the present application has been presented for purposes of illustration and description and can be further modified within the scope and spirit of this disclosure. It is not intended to be exhaustive or to limit the present disclosure to the precise forms disclosed. This application is therefore intended to cover any variations, uses, or adaptations of a device, system and method of the present application using its general principles. Further, this application is intended to cover such departures from the present disclosure as may come within known or customary practice in the art to which this system of the present application pertains. Many variations and modifications of the embodiments described herein will be apparent to one of ordinary skill in the art in light of the above disclosure. The scope of the present disclosure is to be defined only by the claims appended hereto, and by their equivalents.

Further, in describing representative embodiments of the present disclosure, the specification may have presented the method and/or process of the present disclosure as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present disclosure should not be limited to the performance of their steps in the order written, and one skilled in the art can readily appreciate that the sequences may be varied and still remain within the spirit and scope of the present disclosure.

What is claimed is:

1. A method of computing image gradients comprising the steps of:
identifying a set of voxels;
neglecting all voxels within the set of voxels having a gradient length below a predetermined threshold length;
computing a series of local maxima points with sub-voxel precision along the gradient by comparing remaining voxels to neighboring voxels, the series of local maxima points representative of an interior surface of an object boundary that surrounds an interior of the object; and
processing each point in the series to indirectly calculate a curve skeleton of the object by applying a topological analysis to a vector field that is computed based on the series of local maxima points such that the vectors of the vector field point towards the interior of the object;
wherein said method is performed by a system comprising a processor and a storage medium operably connected to the processor, the storage medium capable of receiving and storing morphometric data.

2. The method of claim 1, whereby the series of local maxima points are identified by linearly interpolating the gradients of neighboring voxels in positive and negative directions and wherein the vectors of the vector field are orthogonal to the series of local maxima points.

3. The method of claim 2, whereby the series of local maxima points are identified by comparing the interpolated gradients of the neighboring voxels in positive and negative directions to one another.

4. The method of claim 1, whereby the series of local maxima points are identified by determining a zero of a first derivative of a parabolic curve.

5. The method of claim 1, whereby the neighboring voxels define a cube having a boundary, the gradient is extended bi-linearly to the boundary of the cube such that the boundary of the cube comprises gradients, and wherein the gradients on the boundary of the cube are interpolated linearly to determine an approximation of the desired gradients.

6. The method of claim 1, wherein a voxel within the set of voxels defines a neighborhood comprising twenty-six voxels forming the shape of a cube surrounding the original voxel.

7. The method of claim 1, wherein the processor is operable to perform the steps of said method.

8. The method of claim 1, wherein the system further comprises a program stored upon the storage medium, said program operable by the processor upon the morphometric data.

9. The method of claim 1, whereby the series of local maxima points are identified by determining the gradients of neighboring voxels in positive and negative directions, and whereby the neighboring voxels define a cube having a boundary, the gradient is extended bi-linearly to the boundary of the cube such that the boundary comprises gradients, and wherein the gradients on the boundary of the cube are interpolated linearly to determine the approximation of the desired gradients.

10. The method of claim 1, whereby the series of local maxima points are identified by determining a zero of a first derivative of a parabolic curve, and whereby the neighboring voxels define a cube having a boundary, wherein the boundary of the cube comprises gradients, and wherein the gradients on the boundary of the cube are interpolated linearly to determine an approximation of the desired gradients.

11. A system for extracting a curve-skeleton from a volumetric image of a vessel, the system comprising:
a processor;
a storage medium operably connected to the processor, the storage medium capable of receiving and storing morphometric data;
wherein the processor is operable to:
identify a set of voxels;
neglect all voxels within the set of voxels having a gradient length below a predetermined threshold length;
compute a series of local maxima points with sub-voxel precision along the gradient by comparing remaining voxels to neighboring voxels, the series of local maxima points representative of an interior surface of a vessel boundary; and
process the series of local maxima points having the sub-voxel precision along the gradient to indirectly calculate a curve skeleton of the vessel, the curve skeleton representative of the vessel's centerline.

12. The system of claim 11, whereby the series of local maxima points are identified by determining the gradients of neighboring voxels in positive and negative directions.

13. The system of claim 12, whereby the series of local maxima points are identified by comparing the gradients of neighboring voxels in positive and negative directions to one another.

14. The system of claim 11, whereby the series of local maxima points are identified by determining a zero of a first derivative of a parabolic curve.

15. The system of claim 11, whereby the neighboring voxels define a cube having a boundary, wherein the boundary comprises gradients, and wherein the gradients on the boundary of the cube are interpolated linearly to determine an approximation of the desired gradients.

16. The system of claim 11, wherein a voxel within the set of voxels defines a neighborhood comprising twenty-six voxels forming the shape of a cube surrounding the original voxel.

17. The system of claim 11, further comprising a program stored upon the storage medium, said program operable by the processor upon the morphometric data.

18. The system of claim 11, whereby the series of local maxima points are identified by determining the gradients of neighboring voxels in positive and negative directions, and whereby the neighboring voxels define a cube having a boundary, and wherein the boundary of the cube comprises gradients, and wherein the gradients on the boundary of the cube are interpolated linearly to determine an approximation of the desired gradients.

19. The system of claim 11, wherein the processor is further operable to identify a boundary of the vessel at a sub-voxel level; and
wherein the processing of the series of local maxima points along the gradient to indirectly calculate a curve skeleton of a vessel uses the boundary of the vessel.

20. A non-transitory computer-readable medium encoding a program having a plurality of program steps to be executed on a computer having a processor and a storage medium to extract a curve-skeleton from a volumetric image of a vessel having a local center and a boundary, the program operable to:
  identify a set of voxels;
  neglect all voxels within the set of voxels having a gradient length below a predetermined threshold length;
  compute a series of local maxima with sub-voxel precision along the gradient by comparing remaining voxels to neighboring voxels, the series of local maxima points representative of an interior surface of the vessel boundary that surrounds an interior of the vessel; and
  process each point in the series to indirectly calculate a curve skeleton of the vessel by applying a topological analysis to a vector field that is computed based on the series of local maxima points such that the vectors of the vector field point towards the interior of the vessel;
  wherein the storage medium is operably connected to the processor, the storage medium is capable of receiving and storing the morphometric data.

* * * * *